United States Patent
Ichihara et al.

(10) Patent No.: US 6,744,717 B2
(45) Date of Patent: Jun. 1, 2004

(54) OPTICAL DISK AND OPTICAL DISK DRIVE

(75) Inventors: Katsutaro Ichihara, Yokohama (JP); Akiko Hirao, Chiba (JP); Hideyuki Nishizawa, Tokyo (JP); Toshihiko Nagase, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 10/429,702

(22) Filed: May 6, 2003

(65) Prior Publication Data
US 2003/0193857 A1 Oct. 16, 2003

Related U.S. Application Data

(62) Division of application No. 09/765,685, filed on Jan. 22, 2001, now Pat. No. 6,606,291, which is a division of application No. 09/042,542, filed on Mar. 17, 1998, now Pat. No. 6,187,406.

(30) Foreign Application Priority Data

| Mar. 17, 1997 | (JP) | ............................................. 9-063115 |
| Sep. 12, 1997 | (JP) | ............................................. 9-248289 |
| Sep. 16, 1997 | (JP) | ............................................. 9-251102 |
| Sep. 16, 1997 | (JP) | ............................................. 9-251103 |

(51) Int. Cl.7 .................................................. G11B 7/00
(52) U.S. Cl. .................... 369/53.35; 369/369; 369/47.5
(58) Field of Search .......................... 369/47.5, 53.26, 369/53.27, 53.31, 53.35, 116, 59.11, 59.17, 100, 13.24, 13.25, 13.26, 13.27, 47.25, 124.1, 124.11, 124.12, 13.09

(56) References Cited

U.S. PATENT DOCUMENTS

| 5,546,372 A | | 8/1996 | Ohsawa et al. |
| 5,617,400 A | * | 4/1997 | Fuji ........................... 369/47.5 |
| 5,633,838 A | | 5/1997 | Hirokane et al. |
| 5,666,344 A | | 9/1997 | Imaino |
| 5,699,342 A | * | 12/1997 | Yagi et al. ................ 369/53.37 |
| 5,709,978 A | | 1/1998 | Hirotsune |
| 5,966,347 A | | 10/1999 | Fukada |
| 6,181,650 B1 | | 1/2001 | Ichihara |

FOREIGN PATENT DOCUMENTS

| JP | 2-76126 | 3/1990 |
| JP | 4-246586 | 9/1992 |
| JP | 5-12673 | 5/1993 |
| JP | 5-334726 | 12/1993 |
| JP | 6-28713 | 2/1994 |
| JP | 06-36347 | 2/1994 |
| JP | 6-44609 | 2/1994 |
| JP | 7-201096 | 7/1995 |
| JP | 11-86329 | 3/1999 |

\* cited by examiner

*Primary Examiner*—Thang V. Tran
(74) *Attorney, Agent, or Firm*—Pillsbury Winthrop LLP

(57) ABSTRACT

An optical disk comprising a recording layer and a super-resolution film disposed on the reproduction-beam incident side of the recording layer, wherein the super-resolution film is formed of a fine particle-dispersed film comprising a matrix and semiconductor fine particles dispersed in the matrix or formed of a semiconductor continuous film, and wherein content of a matrix material or a contamination mixed in the semiconductor fine particles or the semiconductor continuous film is not more than 20 at %.

5 Claims, 14 Drawing Sheets

OPTICAL DISK AND OPTICAL DISK DRIVE

This is a Divisional of application Ser. No. 09/765,685, filed Jan. 22, 2001, U.S. Pat. No. 6,606,291, which is a Divisional of application Ser. No. 09/042,542, filed Mar. 17, 1998, U.S. Pat. No. 6,187,406, both of which are hereby incorporated by reference in their entireties.

BACKGROUND OF THE INVENTION

The present invention relates to an optical disk and an optical disk drive which are capable of super-resolution reproduction.

Optical disk memories, which accomplish information reproduction alone or information recording and reproduction by irradiation of a light beam, have been put to practical use as high capacity, fast-access and portable storage media for various files, such as audio data, image data and computer data, and it is expected that their development will continue. Techniques for increasing the density of optical disks include shortening the wavelength of a gas laser for cutting a master, shortening the wavelength of a semiconductor laser as an operating light source, increasing the numerical aperture of an objective lens and making optical disks thinner. Further, with regard to recordable optical disks, various approaches such as mark length recording and land/groove recording are possible.

As a technique having a great effect on improvement on the density of an optical disk, a super-resolution reproduction technique utilizing a medium film has been proposed. The super-resolution reproduction technique was originally proposed as a technique specific to a magneto-optical disk. According to the super-resolution reproduction technique for the magneto-optical disk, a magnetic film (a super-resolution film) is disposed on the reproduction-beam incident side with respect to a recording layer, and both are exchange-coupled or magnetostatically coupled. Then, the temperature of the super-resolution film is raised by irradiation of a reproduction beam to change the exchange force or magnetostatic force, thereby forming an optical mask or an optical aperture in the super-resolution film to realize super-resolution reproduction.

Later, attempts were made in a ROM disk other than the magneto-optical disk, to provide a super-resolution film, whose transmittance varies with irradiation of a reproduction beam, on the reproduction-beam incident side with respect to a recording layer in order to perform super-resolution reproduction. Thus, it has been revealed that the super-resolution reproduction techniques can be adapted to all optical disks such as a magneto-optical disk, a CD-ROM, a CD-R, a WORM and a phase-change optical disk.

The super-resolution reproduction techniques can be classified into a heat mode and a photon mode. Examples of the conventional super-resolution films will be explained.

In the heat mode, a phase change material is employed as a super-resolution film, and the super-resolution film is heated by irradiation of a reproduction beam so as to cause phase change, thereby forming an optical aperture smaller than the reproduction beam spot. The shape of the optical aperture conforms with the isothermal line of the super-resolution film. Since the size of the optical aperture varies easily depending on the ambient temperature, it requires severe thermal control of the super-resolution film in accordance with the linear velocity of the optical disk. In addition, it is difficult for the heat mode super-resolution film to obtain sufficient stability during repeated operation due to the thermal fatigue in reproduction and recording.

In the photon mode, a photochromic material is employed as a super-resolution film, and an optical aperture or an optical mask is formed by utilizing coloring or decoloring of the photochromic material by irradiation of a reproduction beam. The photochromic material causes change in absorption characteristics by the phenomenon that an electron is excited from the ground level to an excited level of short life by irradiation of light and then the electron further shifts from the excited level to a metastable excited level of very long life where the electron is trapped. Accordingly, in order to perform repeated reproduction, the electron trapped at the metastable excited level is required to be deexcited to the ground level. However, an auxiliary beam is irradiated for deexcitation, which leads to two-beam operation, so that it is disadvantageous to realize a high-speed response. Moreover, change in transmittance of the photochromic material is brought about through a complicated process involving atomic migration or change in molecular bond, so that the stability in repeated operation is limited to about 10,000 times.

Japanese Patent Unexamined Publication No. 6-28713 discloses an optical disk provided with a shutter layer for stopping down the size of a light beam. The shutter layer is formed of a glass or resin matrix in which semiconductor particles are dispersed. Semi-conductors described in the reference include CdS, CdSe, CdSSe, GaAs, a-Si, CdTe, CdSe, ZnO, ZnS, ZnSe, ZnTe, GaP, GaN, AlAs, AlP, AlSb and a-SiC. The reference describes that content of the semiconductor particles should preferably be 5 to 70 mol %, and particle size thereof should preferably be 0.1 to 50 nm. Described methods of forming the shutter layer include high-speed quenching and heat treatment, impregnation, a sol-gel method, spin-coating, sputtering and vacuum evaporation.

Likewise, Japanese Patent Unexamined Publication No. 6-44609 discloses an optical recording medium provided with an optical control film containing fine particles of semiconductor, metal or metallic compound, and having transmittance characteristics exhibiting a low transmittance to a low-intensity light beam while exhibiting a high transmittance to a high-intensity light beam. The optical control film is formed of a transparent dielectric, such as $SiO_2$, $Si_3N_4$, $Y_2O_3$, $Al_2O_3$, $Li_3N$, $Ta_2O_5$ and $Nb_2O_3$, or transparent resin in which semiconductor fine particles, such as CdS and CdSe, are dispersed. The reference describes that the particle size of the semiconductor fine particles should preferably be 1 to 20 nm. Described methods of forming the optical control film include sputtering, spin-coating and plasma CVD.

However, these references fail to describe a principle how the shutter layer or optical control film functions as a super-resolution film, and therefore the conditions for obtaining suitable properties to the super-resolution film are not obvious.

As described above, in order to realize super-resolution reproduction of an optical disk, it is required that change in transmittance of the super-resolution film should occur within a range of practical reproduction beam power; the magnitude of the transmittance change should be large enough; an optical aperture should be formed quickly within such a short period of time as the pass time of a reproduction beam spot; and stable repeated reproduction should be accomplished. However, no conventional super-resolution film can meet all of those requirements.

Meanwhile, in a recordable optical disk, a verifying operation of a recorded state is performed in recording.

When a single-beam operated optical disk drive is used, after recording marks have been formed and then a period of time corresponding to one rotation of the optical disk has passed, a reproduction operation called a trial reproduction is performed so as to verify the recorded state. If an error is detected by the verifying operation, re-recording is performed at the same position where the initial recording was performed or at a different position.

Accordingly, even the ordinary recording operation without an error requires a period of time corresponding to two rotations of optical disk for recording and verifying. Further, when an error has occurred, it requires a period of time corresponding to three to four rotations of optical disk for recording, verifying and re-recording (and, if desired, re-verifying). Therefore, it is desired to shorten the time required for verifying.

Furthermore, when the super-resolution reproduction is applied to a medium that exhibits reflectance change of a recording layer in recording, like a phase change optical disk, it has been found that noises increase due to the characteristics of a super-resolution film. Therefore, it is necessary to compensate the noise level so as to improve the quality of reproduction signals.

BRIEF SUMMARY OF THE INVENTION

An object of the present invention is to provide an optical disk, in which change in transmittance of a super-resolution film occurs within a range of practical reproduction beam power, the magnitude of the transmittance change being large enough; and in which an optical aperture can be formed quickly within such a short period of time as the pass time of a reproduction beam spot; and which exhibits stability to repeated reproduction.

Another object of the present invention is to provide an optical disk drive capable of performing verification of a recorded state of an optical disk having a super-resolution film within a short period of time.

Still another object of the present invention is to provide an optical disk drive capable of compensating noise level of reproduction signals of an optical disk having a super-resolution film so as to improve the quality of the reproduction signals.

An optical disk according to the present invention comprises a recording layer and a super-resolution film disposed on the reproduction-beam incident side with respect to the recording layer, wherein the super-resolution film is formed of a fine-particle dispersed film comprising a matrix and semiconductor fine particles dispersed in the matrix or formed of a semiconductor continuous film, and wherein content of a matrix material or contamination mixed in the semiconductor fine particles or the semiconductor continuous film is not more than 20 at %.

An optical disk drive according to the present invention is designed for performing recording and reproduction of an optical disk comprising a recording layer and a super-resolution film disposed on the light incident side with respect to the recording layer, the super-resolution film having a property to be excited by irradiation of light and to emit light on deexcitation after the irradiation of light beam; the optical disk drive comprises an emission detecting means for detecting emission resulting from deexcitation of the super-resolution film caused after the irradiation of the recording beam onto the optical disk; and a verifying means for verifying a recorded state of the optical disk based on emission detection signals supplied from the emission detecting means.

An optical disk drive according to the present invention is designed for performing recording and reproduction of an optical disk comprising a recording layer and a super-resolution film disposed on the light incident side with respect to the recording layer, the super-resolution film having a property to cause change in transmittance by irradiation of light; the optical disk drive comprises a reproduction means for generating a reproduction signal train by irradiating the optical disk with a reproduction beam and then detecting a reflected beam from the optical disk, and a compensating means for compensating the reproduction signal train depending on the characteristics of the super-resolution film.

DETAILED DESCRIPTION OF THE INVENTION

The present invention will be explained in more detail hereinafter.

Figure 1:
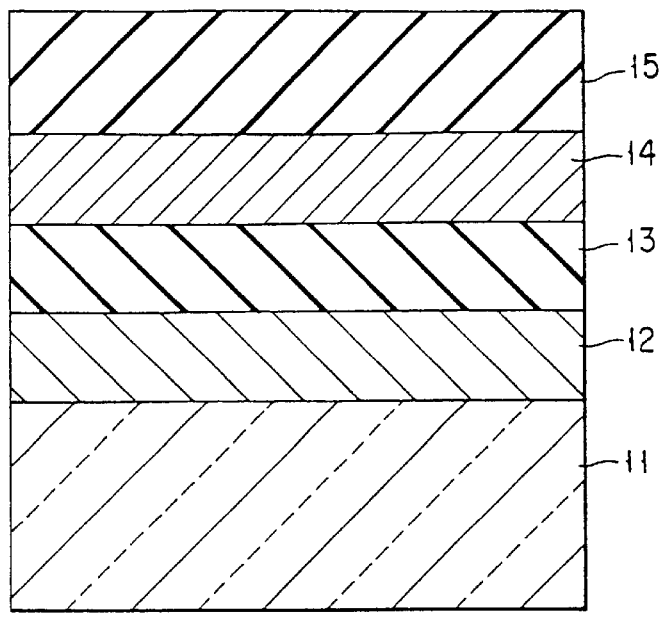
FIG. 1 is a cross-sectional view showing a basic construction of the optical disk according to the present invention.

FIG. 1 shows a cross-sectional view illustrating an example of an optical disk according to the present invention. The optical disk shown in FIG. 1 has a structure in which a super-resolution film 12, an intermediate layer 13, a recording layer 14 and a protective layer 15 are formed on a disk substrate 11. The intermediate layer 13 and the protective layer 15 are provided if desired. A reproduction beam enters the substrate 11, passes through the super-resolution film 12 and the intermediate layer 13 and is incident on the recording layer 14. Thus, the super-resolution film 12 is disposed on the reproduction-beam incident side with respect to the recording layer 14. The reflected beam from the recording layer 14 is detected by a photodetector, and then the output signals from the photodetector are processed to generate reproduction signals.

The super-resolution film employed in the present invention should be formed of a semiconductor fine-particle dispersed film having a structure in which semiconductor fine particles are dispersed in a matrix, or formed of a semiconductor continuous film. The semiconductor fine particles may be agglomerated in the fine-particle dispersed film. The super-resolution film consisting of the semiconductor continuous film may have a quantum well structure constituted by a superlattice in which two or more semiconductor layers are stacked. A quantum size effect is expected with the quantum well structure. Among these super-resolution films, the fine-particle dispersed film is most preferable.

The super-resolution film employed in the present invention forms an optical aperture by absorption saturation of the semiconductor. The absorption saturation means a phenomenon that the semiconductor no longer absorbs light due to decrease in electrons in the ground state, which is caused when the semiconductor is irradiated with light and the electrons in the ground state are shifted to an excited state and kept in the excited state while electrons in the ground state are decreased. The transmittance of the semiconductor is raised if the semiconductor cannot absorb light because of absorption saturation. When the optical disk having the super-resolution film according to the present invention is irradiated with a reproduction beam, absorption saturation is caused in the super-resolution film corresponding to a region where a number of photons are large, i.e., a central portion within a reproduction beam spot, and therefore an optical aperture smaller than the reproduction beam spot is formed. Super-resolution reproduction is performed by detecting recording marks in the recording layer through the optical aperture.

In the present invention, it is desirable that the super-resolution film is maintained in an excited state at least during the irradiation of a reproduction beam and then the super-resolution film is restored to the ground state by deexcitation within a predetermined period of time after the irradiation of the reproduction beam (for example, within one rotation of the optical disk). Specifically, the time constant for the excitation from the excited state of the super-resolution film should preferably be at least twice the time required for the full width at half maximum (FWHM) of the reproduction beam to pass the surface of optical disk.

The present inventors have found that, in order to cause absorption saturation effectively in a semiconductor constituting the super-resolution film, foreign materials mixed in the semiconductor should be as little as possible. Examples of foreign materials include a matrix material and/or contamination. In the present invention, it is necessary that the content of the matrix material and/or contamination mixed in the semiconductor fine particles or the semiconductor continuous film is not more than 20 at %.

In order to form such a super-resolution film, it is required to suppress mixing of the matrix material or contamination into the semiconductor during deposition. For this reason, it is desired to employ the following methods.

For example, it is preferable to employ a combination of a semiconductor material and a matrix, which are poor in wettability to each other. Specifically, $SiO_2$, SiC and BN are suitable as a matrix material for an Si-based semiconductor, On the other hand, C and $B_4C$ are not suitable as a matrix material, since these materials are good in wettability to an Si-based semiconductor. For an Al-based semiconductor, C, $Si_3N_4$, SiC, $SiO_2$, $Y_2O_3$ and $ZrO_2$ are suitable as a matrix material.

In addition, when the super-resolution film is formed by sputtering, for instance, it is preferable to apply a bias of appropriate magnitude to the substrate. When sputtering is performed while applying a bias, particularly an RF bias, to the substrate, ions having appropriate energy are incident on the substrate, thereby promoting surface migration of the sputtered particles deposited on the surface of the substrate. In this case, if the semiconductor material and the matrix material are poor in wettability to each other, the atoms constituting the semiconductor are bonded to each other, and therefore they grow to particles having an appropriate size as well as mixing of the matrix material or contamination into the particles is reduced. In addition, since the atoms constituting the matrix material or contamination are also bonded to each other, these atoms grow network-like between the semiconductor fine particles.

A target of the semiconductor material and a target of the matrix material may be simultaneously sputtered by way of a binary sputtering, or a composite target of a matrix material and a semiconductor material may be sputtered. It is also possible to employ ion-beam sputtering, vacuum evaporation or CVD other than RF sputtering.

There is no particular restriction regarding the matrix material when the semiconductor fine-particle dispersed film is employed as a super-resolution film according to the present invention. The matrix material can be selected from a wide variety of materials, which are transparent to the wavelength of a reproduction beam to be employed, such as $SiO_2$, Si—N, Al—O, Al—N and B—N.

Since the super-resolution film according to the present invention utilizes absorption saturation resulting from the transition of electrons in the semiconductor from the ground level to an upper level, a criterion for selection of the semiconductor is that the energy gap (forbidden band width) thereof approximately corresponds to the energy of the reproduction beam. Two levels to be concerned with the excitation may be selected from valence band, impurity level in the forbidden band, exciton level and conduction band. For example, when a reproduction beam having a wavelength of 650 nm (1.92 eV) is employed, favorable semiconductors that cause absorption saturation by excitation from the valence band to the conduction band are AlSb, CdSe, GaAs, InP, CdTe and InSe. Note that the energy gap of the semiconductor can be adjusted by forming an impurity level (a deep dope level or light dope level) in the forbidden band. For instance, semiconductors such as $Cu_2O$, AlP, AlAs, GaP, ZnO, ZnS, ZnSe, ZnTe, CdS and $TiO_2$ have a large energy gap. However, if an impurity is doped into these semiconductors to form an impurity level in the forbidden band, the energy gap of the semiconductors can be made narrow so as to make it close to the energy of a reproduction beam.

Although a typical material having the aforementioned energy gap is a semiconductor, it is also possible to employ a semi-metal or an insulator, as long as it has an appropriate energy gap.

Table 1 shows the energy gap (Eg) of typical semiconductor materials and wavelength (λg) corresponding to the energy gap.

TABLE 1

|  | Eg (eV) | λg (nm) |
| --- | --- | --- |
| ZnO | 3.44 | 360 |
| ZnS | 3.84–3.91 | 317–324 |
| ZnSe | 2.83 | 438 |
| ZnTe | 2.39 | 519 |
| CdS | 2.5–2.6 | 477–496 |
| CdSe | 1.84 | 674 |
| CdTe | 1.607 | 772 |
| AlP | 2.5 | 496 |
| AlSb | 1.55 | 800 |
| AlAs | 2.3 | 539 |
| GaN | ~3.76 | ~330 |
| GaAs | 1.35 | 919 |
| GaP | 2.35 | 528 |
| Si | 1.12 | 1107 |
| SiC | 2.8 | 443 |

Next, the characteristics of the super-resolution film employed in the present invention will be explained. Here, a super-resolution film having a structure that CdSe fine particles are dispersed in an $SiO_2$ matrix, which is deposited on a glass substrate, is explained as an example. The energy gap of bulk CdSe at 0K is approximately 1.84 eV. Therefore, CdSe will cause direct transition from the valence band to the conduction band by irradiation of a reproduction beam having a wavelength of 650 nm (1.91 eV).

The super-resolution film is formed by setting a CdSe target, an $SiO_2$ target and a glass substrate in a magnetron sputtering apparatus and then by subjecting both targets to an RF sputtering simultaneously. In this case, it is possible to adjust content of CdSe in the super-resolution film depending on sputtering simultaneously. In this case, it is possible to adjust the content of CdSe in the super-resolution film depending on sputtering power applied to each target. It is also possible to adjust the particle size of the CdSe fine particles depending on bias power applied to the substrate. The bias to the substrate allows to promote the surface migration of the sputtered particles on the surface of the film being deposited. Thus, if the bias power is low, the particle size of the fine particles would be reduced, whereas if the bias power is high, the particle size of the fine particles would be enlarged due to the surface migration effect as well as the agglomeration effect between the same kind of material. It is also possible to suppress mixing of the matrix material or contamination into the semiconductor fine particles to not more than 20 at %.

The transmittance of the super-resolution film is investigated with a photodetector by irradiating the super-resolution film with a laser beam having a wavelength of 650 nm and a pulse width of 50 ns through an objective lens having NA of 0.6 while changing the power. The spot size of the laser beam on the surface of the sample is 0.89 μm in $e^{-2}$ width and about 0.5 μm in full width at half maximum. The reason for setting the pulse width to 50 ns is to conform it to the pass time (50 ns) of the full width at half maximum of the beam spot when the optical disk is operated at a linear velocity of 10 m/s.

Figure 2:
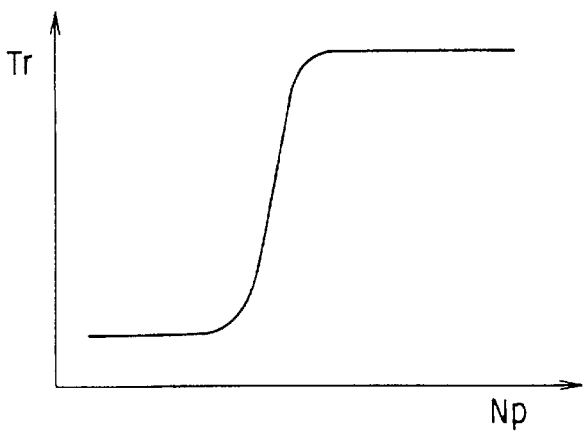
FIG. 2 is a graph showing a relationship between number of incident photons (Np) and transmittance (Tr) with a super-resolution film according to the present invention.

FIG. 2 shows a relationship between the number of incident photons (Np) and the transmittance (Tr). The number of incident photons on the abscissa is proportional to the power of the reproduction beam. That is, if the power of the reproduction beam is represented by P(W), the number of incident photons Np can be defined by the following equation:

$$Np = P \times \tau p (1240/\lambda \times 1.6 \times 10^{-19}) \quad (1)$$

wherein τp is an irradiation time [second] of the reproduction beam; and λ is a wavelength [nm].

In the equation (1), the numerator represents light energy, while the denominator represents the energy [J] that a single photon has. The value "1240" means a wavelength [nm] corresponds to 1 eV. The value "$1.6 \times 10^{-19}$" is a conversion factor for eV to J.

Assignment of τp=50 ns and λ=650 nm to the equation (1) gives Np of $1.64 \times 10^{-18}$ photons/mW relative to the reproduction power of 1 mW. When the number of incident photons Np is divided by the full width at half maximum, the number density of photons of $8 \times 10^{-16}$ photons/mW·cm$^2$ can be obtained.

It is generally assumed that, in order to obtain a significant change in transmittance through the absorption saturation of semiconductor, about $5 \times 10^{16}$ of molecules or atoms are required to be excited. Judging from the above number density of photons, it is estimated that a sufficient transmittance change can be attained under a probable quantum efficiency of about 0.5.

FIG. 2 indicates that until the number of photons Np reaches to the value corresponds to a power of 0.7 mW, the density of molecules in the ground level is relatively high so that the light is effectively absorbed, thus the transmittance comes to a low value of about 30%. When the power exceeds 0.7 mW, the transmittance is sharply increased.

When the power exceeds 1.3 mW, the transmittance is saturated at about 70%. For reference, if the laser beam is irradiated not in a pulsed mode but in a continuous mode, a high transmittance can be obtained even if the power is low, since the time-integrated number of photons is large. In view of these facts, it will be clear that the characteristics shown in FIG. 2 are brought about by the absorption saturation phenomenon.

Note that, depending on a material, the super-resolution film may show characteristics that Tr is high when Np is small, and Tr is lowered as Np is increased, opposite to the above characteristics.

Figure 3:
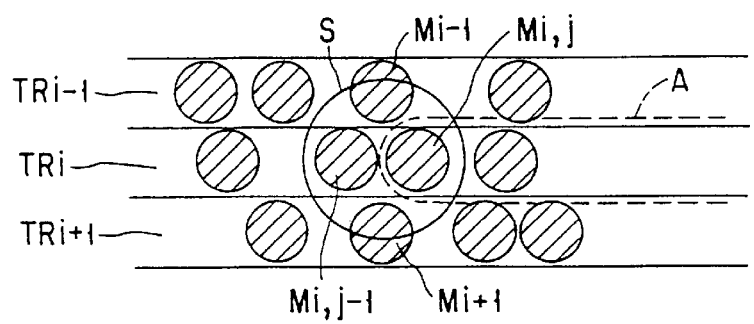
FIG. 3 is a diagram showing a relationship among recording marks, a reproduction beam spot and an optical aperture.

FIG. 3 shows a relationship among recording marks, a reproduction beam spot and an optical aperture when reproduction of the optical disk of FIG. 1 provided with a super-resolution film exhibiting the characteristics shown in FIG. 2 is performed. In FIG. 3, the symbol TR denotes recording tracks, wherein $TR_i$ is a track being reproduced, and $TR_{i-1}$, and $TR_{i+1}$ are the neighboring tracks to the $TR_i$. The symbol S denotes an $e^{-2}$ diameter of a reproduction beam spot. The symbol M denotes recording marks formed in the recording layer. These recording marks are formed at a narrow pitch. Thus, there are two or more recording marks within the reproduction beam spot as shown in FIG. 3. Therefore, it would be impossible, in an optical disk which is not provided with a super-resolution film, that these recording marks cannot be discriminated individually, since inter-symbol interference is enhanced.

In the case where a super-resolution film according to the present invention is provided, transmittance is raised only in a region where a number of incident photons is large, if a reproduction power is selected appropriately. The number of incident photons is referred to as the number of photons which is integrated during the time of the optical disk movement with respect to the reproduction beam spot. In FIG. 3, the transmittance is high in the region "A". In the region other than "A", substantially no light is transmitted. The portion contributes to the reproduction signals is where the reproduction beam spot S overlaps with the region "A". Accordingly, it is possible according to the present invention to discriminate easily even recording marks of such a high density that cannot be discriminated in the conventional optical disk which is not provided with the super-resolution film. Furthermore, in the conventional optical disk, crosstalk with the neighboring recording marks $M_{i-1}$ and $M_{i+1}$ formed on the neighboring tracks may arise. For this reason, it is impossible in the conventional optical disk to shorten track pitch so much. By contrast, it is possible according to the present invention to shorten track pitch, since crosstalk with the neighboring recording marks $M_{i-1}$ and $M_{i+1}$ formed on the neighboring tracks does not arise.

The present invention makes use of absorption saturation by excitation to an excited level of relatively long life. The excited level is not metastable, so that deexcitation to the ground state is completed after a period of several hundreds of microseconds at the latest. Thus, the optical aperture can be closed by single-beam operation. Therefore, it is not necessary to use an auxiliary beam for closing the optical aperture, unlike the conventional photon mode super-resolution film employing a photochromic materials.

Figure 4A:
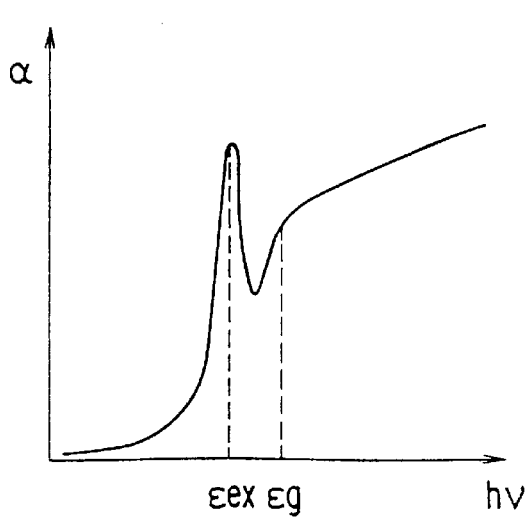
FIGS. 4A and 4B are graphs showing a relationship between absorbance and light energy with an optical disk according to the present invention before and after absorption saturation of semiconductor contained in a super-resolution film is caused.
Figure 4B:
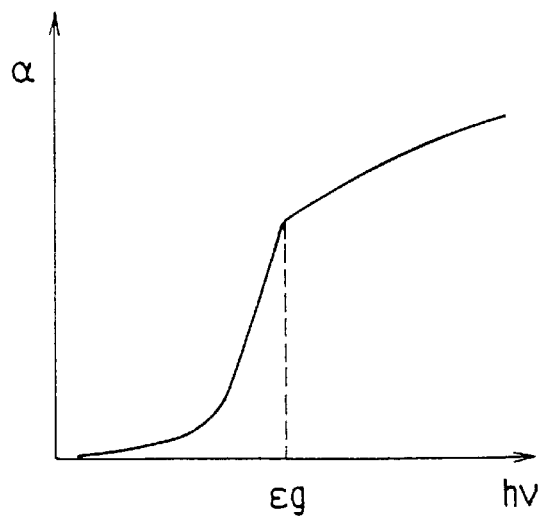

In the present invention, absorption saturation based on excitation from a valence band to an exciton level may be utilized. FIG. 4A shows the dependency of absorbance ($\alpha$) of a semiconductor contained in a super-resolution film on light energy (hv) before absorption saturation. The absorbance ($\alpha$) exhibits a peak when the light energy becomes equivalent to the energy level of exciton $\epsilon_{ex}$ (hereinafter referred to simply as an exciton level). Thereafter, when the light energy becomes almost equivalent to the energy gap $\epsilon_g$, the absorbance ($\alpha$) increases gradually. On the other hand, FIG. 4B shows the dependency of the absorbance ($\alpha$) of a semiconductor contained in a super-resolution film on light energy (hv) in the case where the semiconductor has been in a state of absorption saturation. The larger the difference in absorbance ($\alpha$) between before and after the absorption saturation is, the larger the change in transmittance would be brought about. As seen from FIGS. 4A and 4B, if the absorption saturation based on the transition from the valence band or impurity level to the exciton level is utilized, as compared with the case of inter-band transition, larger change in transmittance would be expected.

When a semiconductor is made into fine particles, the energy gap $\epsilon_g$ and the exciton level $\epsilon_{ex}$ are generally shifted to a higher energy side. The exciton level $\epsilon_{ex}$ can be adjusted by the particle size R of the fine particle and the effective Bohr radius $a_{ex}$ of the exciton. The period for deexcitation can also be adjusted by the particle size R of the fine particle and the effective Bohr radius $a_{ex}$. The period for deexcitation is known to be prolonged as the particle size of the fine particle becomes smaller.

The exciton level $\epsilon_{ex}$ and effective Bohr radius $a_{ex}$ can be estimated by the following equations:

$$\epsilon_{ex} = \epsilon_g - 13.6 \times (1/\epsilon_o^2) \times (\mu_{ex}/m_o) \quad (2)$$

$$a_{ex} \, 0.529 \times \epsilon_o \times (m_o/\mu_{ex}) \quad (3)$$

wherein $\epsilon_o$ is a dielectric constant of a semiconductor material, and $m_o$ is a mass of electron; and $\mu_{ex}$ is an equivalent mass of exciton, which is expressed by the following equation provided that $m_e^*$ is an effective mass of electron and $m_h^*$ is an effective mass of hole:

$$1/\mu_{ex} = 1/m_e^* + 1/m_h^* \quad (4)$$

The exciton level $\epsilon_{ex}$ is generally lower than the energy gap $\epsilon_g$ by several meV to several tens meV. Accordingly, a semiconductor to be contained into a super-resolution film is selected by taking into consideration the fact that the energy gap $\epsilon_g$ as well as the exciton level $\epsilon_{ex}$ are shifted to a higher energy side (a lower wavelength side) as the semiconductor is made finer.

Table 2 shows the energy gap $\epsilon_g$ and exciton level $\epsilon_{ex}$ of typical semiconductors, together with the corresponding wavelengths $\lambda_g$ and $\lambda_{ex}$, and the effective Bohr radius $a_{ex}$ of the exciton.

TABLE 2

| | $\epsilon_g$ (ev) | $\lambda_g$ (nm) | $\epsilon_{ex}$ (eV) | $\lambda_{ex}$ (nm) | $a_{ex}$ (A) |
|---|---|---|---|---|---|
| Si | 1.1698 | 1060 | 1.1551 | 1074 | 42.9 |
| AlAs | 2.229 | 556 | 2.203 | 563 | 27.5 |
| GaP | 2.350 | 528 | 2.3284 | 533 | 30.2 |
| InAs | 0.4180 | 2967 | 0.4163 | 2979 | 279 |
| ZnS | 3.911 | 317 | 3.8714 | 320 | 21.1 |
| ZnSe | 2.822 | 439 | 2.8015 | 443 | 40.2 |
| ZnTe | 2.391 | 519 | 2.381 | 521 | 71.2 |
| CdS | 2.582 | 480 | 2.55 | 486 | 26.2 |
| CdSe | 1.840 | 674 | 1.82 | 681 | 37.9 |
| CdTe | 1.606 | 772 | 1.59 | 780 | 44.0 |
| CuCl | 3.416 | 363 | 3.20 | 388 | 4.8 |

Next, an optical disk drive according to the present invention which is capable of verifying a recorded state will be explained. In the optical disk drive, verification of the recorded state is performed by utilizing emission resulting from deexcitation of the super-resolution film caused after an optical disk is irradiated with recording beam.

Figure 5A:
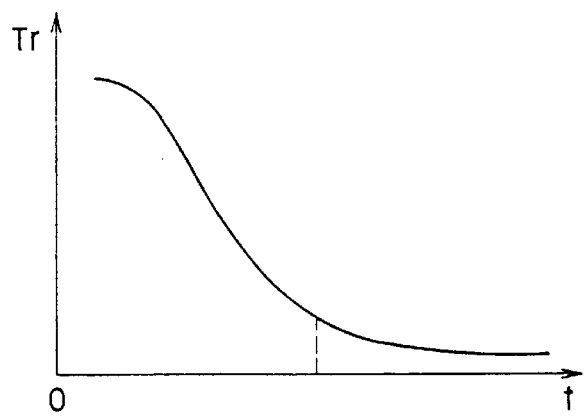
FIGS. 5A and 5B are graphs showing change with time of transmittance and change with time of emission intensity on deexcitation of a super-resolution film employed in an optical disk of the present invention.
Figure 5B:
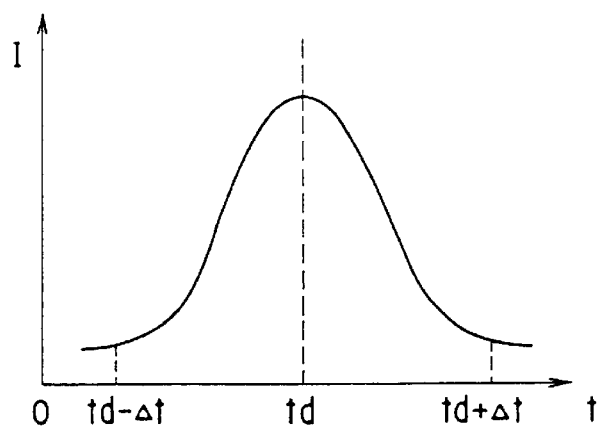

FIG. 5A shows change in transmittance Tr from the time t=0 when the transmittance of a super-resolution film has been made maximum because of absorption saturation to the time when the transmittance becomes minimum or the original value resulting from the deexcitation. FIG. 5B shows change in emission intensity depending on the deexcitation of the super-resolution film. If the life (time constant) of deexcitation is represented by "$t_d$", the intensity of emission resulting from the deexcitation becomes maximum in the vicinity of the time $t_d$. Note that the characteristics shown in FIG. 5B can be seen not only in the super-resolution film but also in the ordinary luminescent film.

In the super-resolution film used in the present invention, it is possible to prolong the time constant of deexcitation by reducing the particle size of the semiconductor fine particles or by providing suitable impurity levels so as to cause multi-stage deexcitation. In this case, the emission resulting from the deexcitation becomes maximum at a position sufficiently spaced apart from the irradiation position of a recording or reproduction beam. For example, if the linear velocity of the optical disk is set to 20 m/s and a super-resolution film a deexcitation life of which is 1 ms is employed, the position where the emission resulting from the deexcitation is detected can be spaced apart by about 20 mm from the irradiation position of the recording/reproduction beam. Therefore, the emission resulting from the deexcitation can be detected by disposing other optical system at a backward position with respect to the recording/reproduction optical system along the track direction.

The principle of the verifying operation in recording and erasing according to the present invention will be explained. Here, the explanation is made as to the case where the recording layer 14 of the optical disk shown in FIG. 1 is made of a phase change material. The recording layer 14 is crystalline in the initial state before recording. When the recording layer 14 is irradiated with a recording beam, it is caused to melt and then solidified to form an amorphous recording mark. The reflectance (Rc) of the crystalline unrecorded portion is higher than the reflectance (Rm) of the melted portion in a process of forming an amorphous recording mark and the reflectance (Ra) of an amorphous recording mark.

Figure 6A:
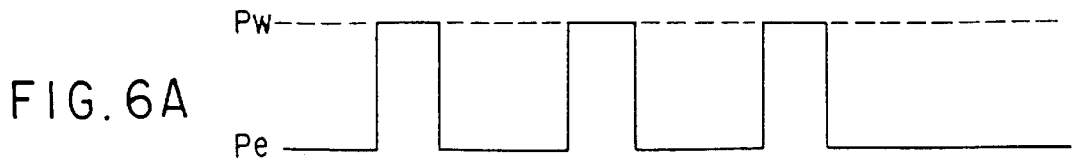
FIGS. 6A to 6F are timing charts for explaining verifying operations in recording and erasing according to the present invention.
Figure 6B:
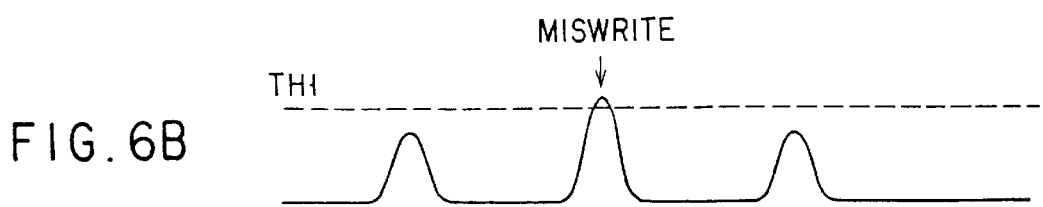
Figure 6C:
Figure 6D:
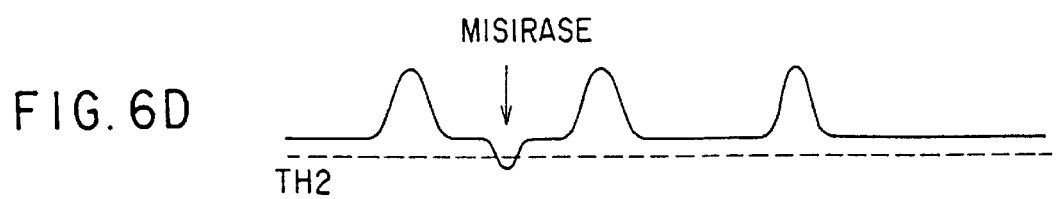
Figure 6E:
Figure 6F:
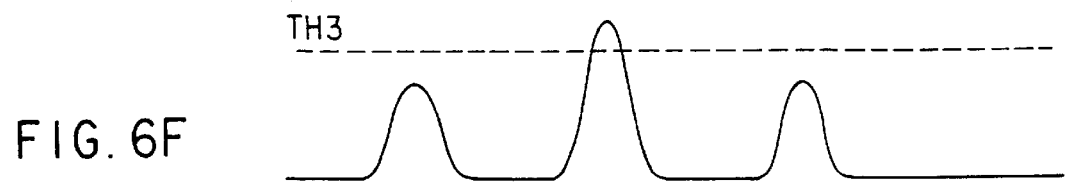

FIGS. 6A to 6F illustrate the timing charts in recording and erasing. FIG. 6A shows the power Pw of the recording beam and the power Pe of the erasing beam. FIG. 6B shows detection signals of emission from the super-resolution film, which illustrate that a miswrite has occurred in a part of the recorded portions. FIG. 6C shows a miswrite signal detected by a recording-verifying operation. FIG. 6D shows detection signals of emission from the super-resolution film, which illustrate that a miserase has occurred in a part of the recorded portions. FIG. 6E shows a miserase signal detected by an erasing-verifying operation. FIG. 6F shows integrated signals of emission from the super-resolution film.

As shown in FIG. 6A, a recording beam and an erasing beam changing pulse-wise in the range between the recording power $P_w$ and the erasing power $P_e$ are irradiated from the side of the optical disk substrate 11. When a light beam is irradiated, an optical aperture is formed because of increase in transmittance of the super-resolution film 12, through which the light beam is incident on the recording layer 14.

FIG. 6B illustrates that a miswrite has occurred with the second recording pulse of the recording beam shown in. FIG. 6A. The recording is performed by converting the crystalline recording layer 14 into amorphous, thereby forming a recording mark. In this time, the light intensity incident on the super-resolution film 12 is a total of the light intensity Io directly enters the super-resolution film 12 and the light intensity reflected from the recording layer 14. When a light beam of power $P_w$ is irradiated, the transmittance of the optical aperture formed in the super-resolution film 12 is made to be Trw. In the process of ordinary recording, the recording layer 14 is in a molten state, the reflectance of which is Rm. If a miswrite has occurred in the recording layer, the recording layer is kept in a crystalline state, the reflectance of which is Rc. Accordingly, the light intensity incident on the super-resolution film 12 can be expressed by the following equations: in the case where a recording is performed;

$$Io+Trw \times Rm \times Io=(1+Trw \times Rm)Io,$$

and in the case where a miswrite has occurred;

$$Io+Trw \times Rc \times Io=(1+Trw \times Rc)Io.$$

Since there is a relationship of Rc>Rm as described above, the light intensity incident on the super-resolution film 12 becomes higher in the case where the miswrite has occurred as compared with in the case where the recording is performed. Accordingly, the signal level of the emission from the super-resolution film indicates the similar relationship as shown in FIG. 6B. Therefore, a threshold operation of the detection signals shown in FIG. 6B with a predetermined threshold value of TH1 gives a miswrite detection signal as shown in FIG. 6C.

FIG. 6D illustrates that a miserase has occurred with the erasing pulse between the second and the third recording pulses shown in FIG. 6A. The erasing is performed by irradiating the recording layer 14 with an erasing beam having erasing power $P_e$ so as to recrystallize the amorphous recording mark. In this time, an optical aperture is formed in the super-resolution film 12, the transmittance of which is made to be Tre. The recording layer 14 is turned back to crystalline when the erasing is performed, while the recording layer 14 is kept amorphous in the case of the miserase. Therefore, the light intensity incident on the super-resolution film 12 can be represented by the following equations: in the case where the erasing is performed;

$$Io+Tre \times Rc \times Io=(1+Tre \times Rc)Io,$$

and in the case where the miserase has occurred;

$$Io+Tre \times Ra \times Io=(1+Tre \times Ra)Io.$$

Since there is a relationship of Rc>Ra as described above, the light intensity incident on the super-resolution film 12 becomes smaller in the case where the miserase has occurred as compared with in the case where the erasing is performed. Accordingly, the signal level of the emission from the super-resolution film indicates the similar relationship as shown in FIG. 6D. Therefore, a threshold operation of the detection signals shown in FIG. 6D with a predetermined threshold value of TH2 gives a miserase detection signal as shown in FIG. 6E.

In the foregoing description, an example is explained in which the reflectance Rc of the crystalline portion of the recording layer 14 is larger than the reflectance Ra of the amorphous recording mark. On the contrary, in the case where the reflectance Ra of the amorphous recording mark is larger than the reflectance Rc of the crystalline portion, the polarity of the detection signals is merely reversed. Thus, it is also possible to detect the miswrite and miserase in the same manner as described above.

Figure 7:
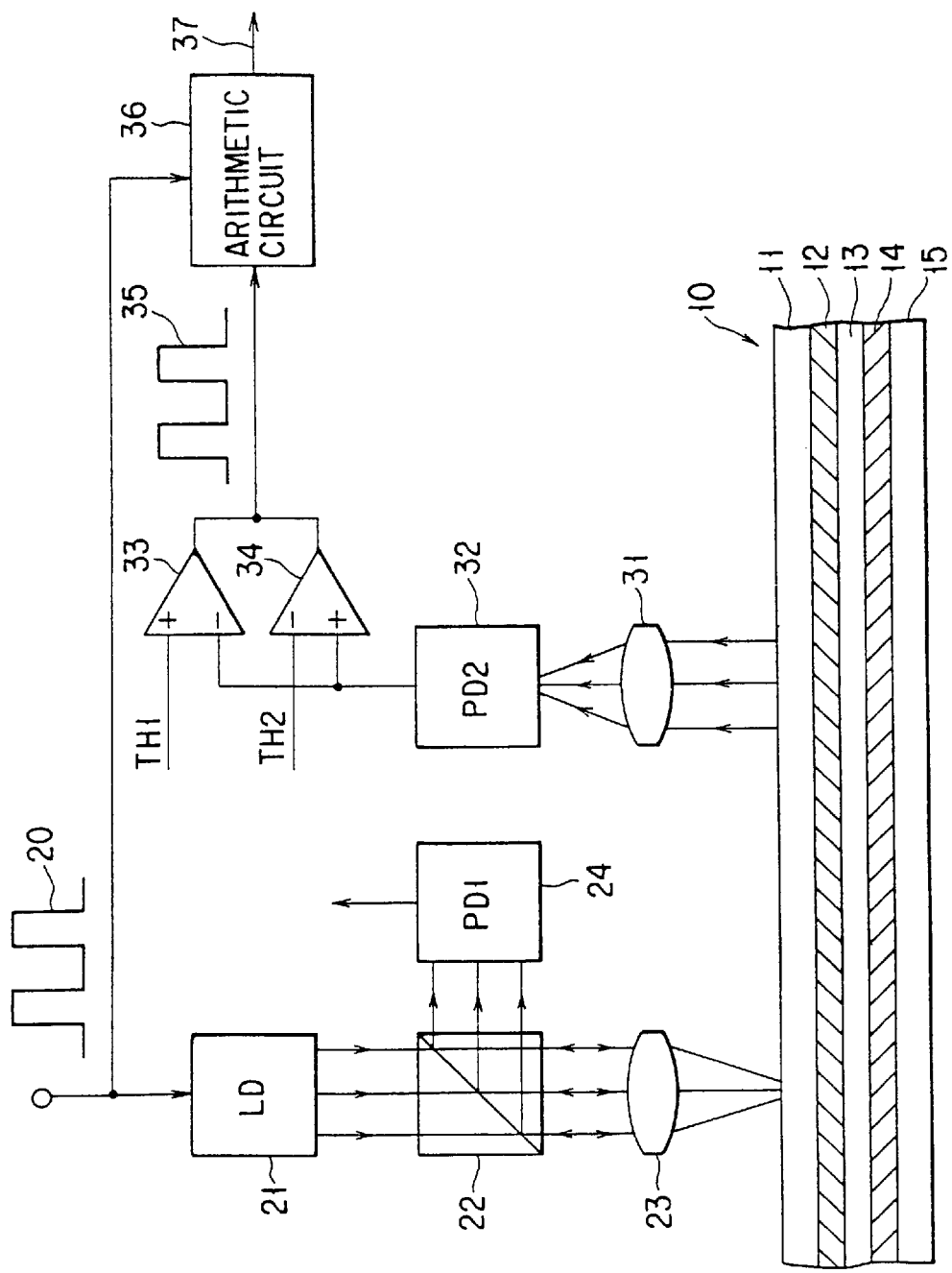
FIG. 7 is a diagram showing the construction of an optical disk drive having a verifying function in recording and erasing according to the present invention.

FIG. 7 shows the construction of an optical disk drive having a verifying function in recording and erasing. The optical disk 10 is the same as shown in FIG. 1.

In the recording/erasing of the optical disk 10, the light source (a semiconductor laser) 21 is operated by the recording/erasing signal train 20. The recording power and erasing power are as shown in FIG. 6A. The recording/erasing beam passes through a beam splitter 22 and a first objective lens 23, and then is incident on the substrate 11 side as a fine spot.

The beam reflected from the optical disk 10 passes through the first objective lens 23 in the opposite direction to that of the incident beam, and introduced via the beam splitter 22 into the first photodetector 24 so as to be detected as electric signals. The first photodetector 24 is, for example, a split photodetector whose light-receiving surface is divided in a plurality of sections (for example, two or four sections). Based on the plurality of output signals corresponding to respective divided surfaces, error signals for focusing and tracking are generated.

In order to verify during recording/erasing, a second objective lens 31, a second photodetector 32, a first and a second comparators 33 and 34, and an arithmetic circuit 36 are provided. The first and second comparators 33 and 34 generate a verifying signal train 35 according to miswrite or miserase. The arithmetic circuit 36 generates a re-recording/erasing signal train 37 for carrying out a re-recording/erasing to the optical disk 10 based on the verifying signal train 35 and the recording/erasing signal train 20.

The emission on deexcitation of the super-resolution film 12 generated at $t_d$ second after the passing of a recording/erasing beam (approximately the time when the emission intensity becomes maximum) is converged by the second objective lens 31. The emission is detected as electric signals by the second photodetector 32. The emission detection signals from the second photodetector 32 is fed to the first and second comparators 33 and 34. The first comparator 33 compares the emission detection signals from the second photodetector 32 with the threshold value TH1 and outputs a miswrite detection signal if the signal level of the emission detection signals is higher than the threshold value TH1. Likewise, the second comparator 33 compares the emission detection signals from the second photodetector 32 with the threshold value TH2 and outputs a miserase detection signal if the signal level of the emission detection signals is lower than the threshold value TH2.

The outputs of the first and second comparators 33 and 34 are combined and then fed to the arithmetic circuit 36 as a recording/erasing verifying signal train 35 that is a result of the verification of the recording/erasing state. The arithmetic circuit 36 checks the recording/erasing verifying signal train 35 with the recording/erasing signal train 20 so as to generate a re-recording/erasing signal train 37. For example, positions on the optical disk 10 at which the miswrite or miserase has occurred is determined from the recording/erasing verifying signal train 35, and then the re-recording/erasing signal train 37 is generated for carrying out a re-recording or re-erasing on those positions (or other positions).

If the emission intensity on deexcitation of the super-resolution film 12 is very weak, the detection signals from the second photodetector 32 should preferably be integrated. Specifically, as shown in FIG. 5B, the detection signals from the second photodetector 32 are integrated during a period of $2\Delta t$ ranging from $t_d \times \Delta t$ to $t_d + \Delta t$ and then fed to the first and second comparators 33 and 34. For example, integration of the emission detection signals shown in FIG. 6B gives signals shown in FIG. 6F. By setting the threshold value TH3 to the first comparator 33 for the integrated signal shown in FIG. 6F, a miswrite can surely be detected even if the emission intensity on deexcitation of the super-resolution film 12 is very weak. A miserase also can surely be detected in the same manner.

In the foregoing description, explained is the case where verifying is performed by utilizing the emission on deexcitation of super-resolution film. When a luminescent film not exhibiting the super-resolution property is employed in place of the super-resolution film, it is also possible to perform verifying the state of recording/erasing by detecting a miswrite or a miserase based on the same principle. Such luminescent film include those made of materials exhibiting emission from a localized center such as an F-center, a transition metal ion, a rare earth metal ion and an organic compound having $\pi$ electrons.

Next, an optical disk drive capable of compensating reproduction signals will be explained. The present inventors have found a phenomenon that noises on the reproduction signals increase when a super-resolution reproduction is adapted to an optical disk which exhibits change in reflectance of the recording layer as a result of recording. First, the mechanism for the phenomenon will be explained.

Figure 8:
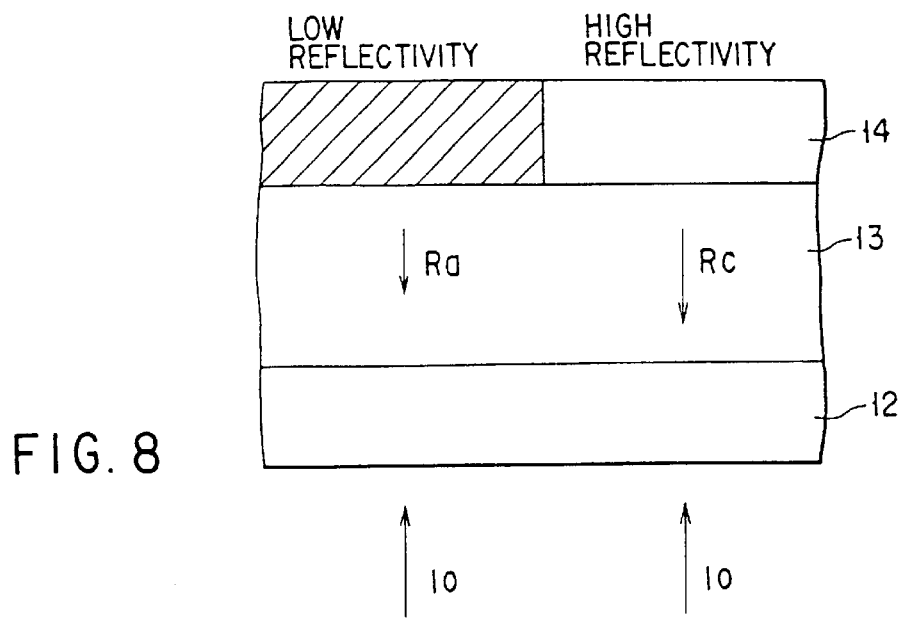
FIG. 8 is a schematic view showing a main portion of a reflectance-change type optical disk.

As shown in FIG. 8 schematically, in this optical disk, an intermediate layer 13 and a recording layer 14 are stacked on a super-resolution film 12. The recording layer 14 in which recording has been performed is constituted by an amorphous recording mark or a portion having a low reflectance (Ra), which is hatched, and a crystalline unrecorded portion or a portion having a high reflectance (Rc), which is not hatched.

When reproduction of the optical disk is performed, a reproduction beam having certain intensity of Io is irradiated onto the optical disk from the super-resolution film 12 side, i.e., from the lower side in FIG. 8. As a result of the irradiation of the reproduction beam, an optical aperture having transmittance of Trr in the central portion of the spot is formed on the super-resolution film 12, through which the beam passes selectively and is incident on the recording layer 14. At this time, the reproduction beam of the intensity Io is directly incident on the super-resolution film 12 as well as a beam reflected from the recording layer 14 is incident on the super-resolution film 12. The total light intensity incident on the super-resolution film 12 is given as follows: when the reproduction beam is incident on the amorphous recording mark;

$$(1+Trr \times Ra)Io,$$

and when the reproduction beam is incident on the crystalline unrecorded portion;

$$(1+Trr \times Rc)Io.$$

Figure 9A:
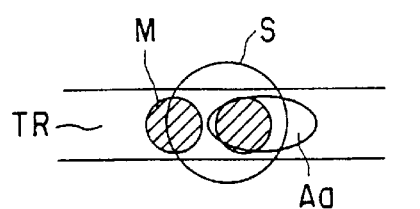
FIGS. 9A and 9B are diagrams for illustrating the principle of super-resolution reproduction.
Figure 9B:
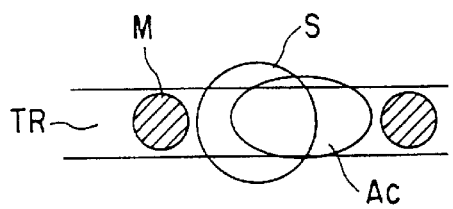

Since Rc>Ra is met with regard to the reflectance of the recording layer 14 as mentioned above, the number of photons incident on the super-resolution film 12 varies depending on the recording state of the recording layer 14. As a result, the size of the optical aperture also varies as shown in FIGS. 9A and 9B. Namely, as shown in FIG. 9A, when the reproduction beam spot is mainly incident on the recording mark M (represented by the hatching), the size of the optical aperture Aa is relatively small. On the other hand, as shown in FIG. 9B, when the reproduction beam spot is mainly incident on the crystalline portion other than the recording mark, the size of the optical aperture Ac is relatively large.

Figure 10:
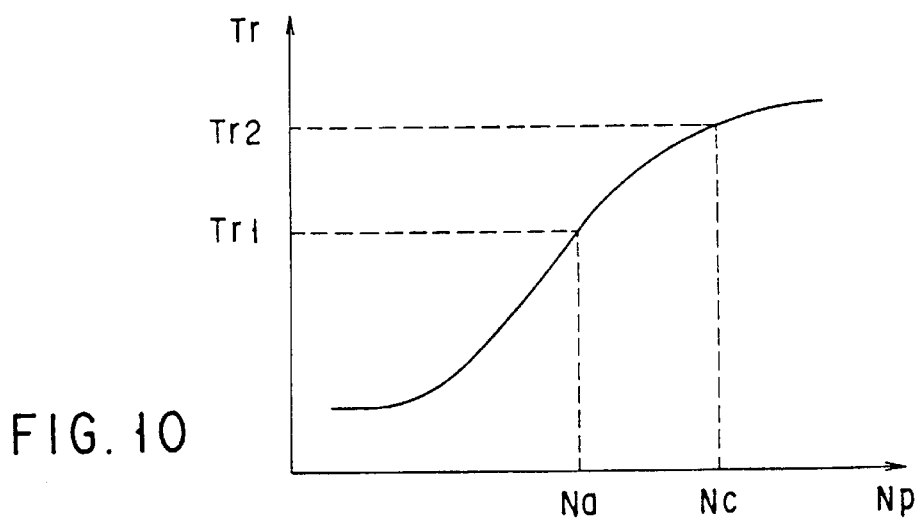
FIG. 10 is a graph showing a relationship between number of incident photons (Np) and transmittance (Tr) with a super-resolution film according to the present invention.

Furthermore, the relationship between the number of incident photons Np and the transmittance Tr differs depending on positions in such a manner that Na to Tr1 at a position corresponding to the recording mark and Nc to Tr2 at the position corresponding to the unrecorded portion, as shown in FIG. 10.

The change of the optical aperture in the super-resolution film 12 as described above becomes a cause for distorting reproduction signals and hence a cause for degrading the CNR (carrier-to-noise ratio) of the reproduction signals. Therefore, in order to improve the quality of reproduction signals, it is desirable to compensate the reproduction signals in conformity with the characteristics of the super-resolution film 12. In this case, as a basis for compensating the reproduction signals, the characteristic data of the transmittance in relative to the number of incident photons Np, shown in FIG. 10, is employed. For example, the reproduction signals are compensated based either on the transmittance of the super-resolution film where the recording layer is high in reflectance or on the transmittance of the super-resolution film where the recording layer is low in reflectance. The transmittance characteristic data of the super-resolution film may be stored in a storage means such as an ROM so as to read out the data for compensating the reproduction signal. Alternatively, the emission resulting from the deexcitation of the super-resolution film after the optical disk is irradiated with a reproduction beam is detected at first, and then the reproduction signals may be compensated based on the emission detection signals.

Figure 11:
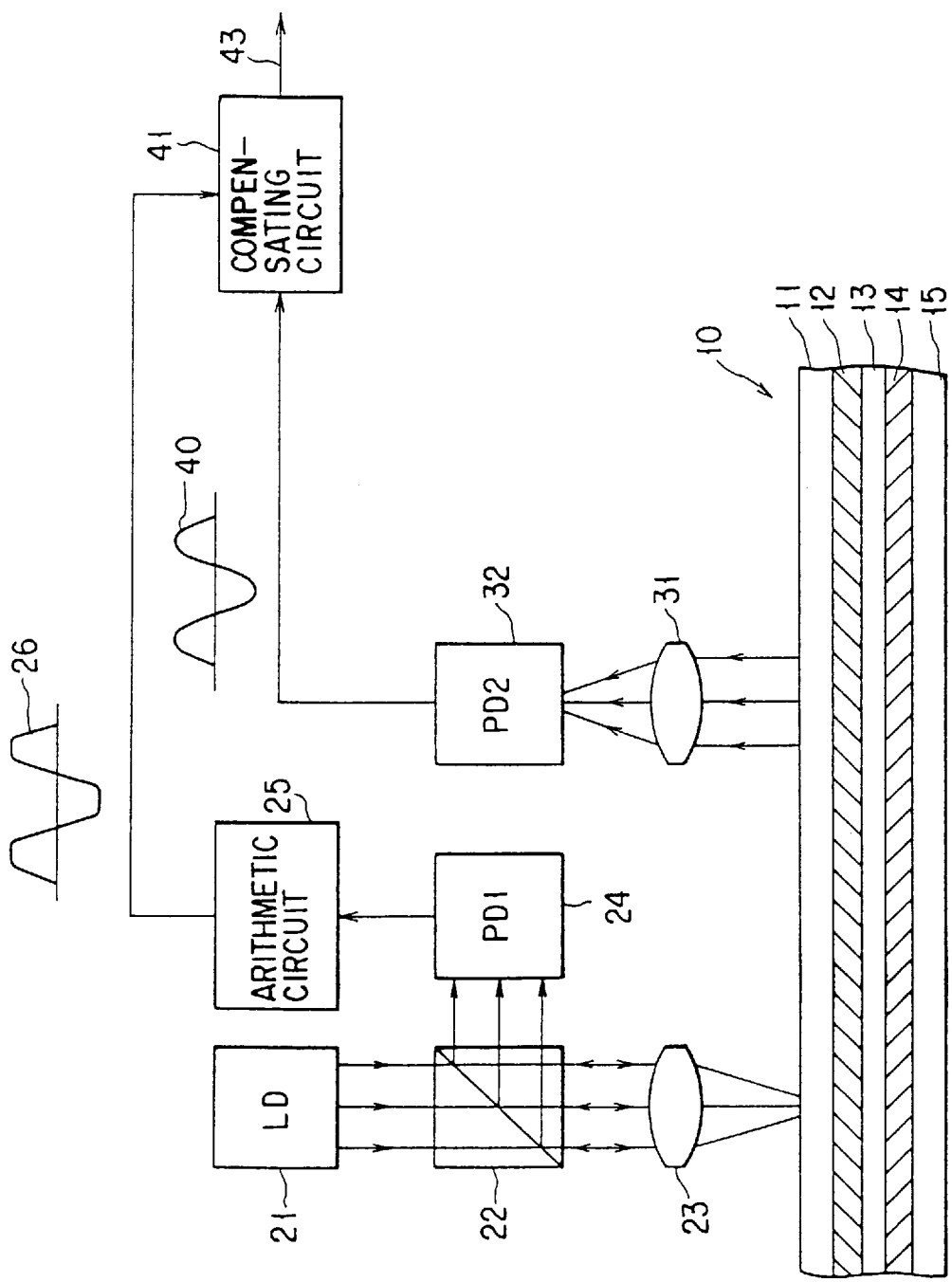
FIG. 11 is a diagram illustrating the construction of an optical disk drive having a reproduction signal compensating function according to the present invention.

Next, an example of an optical disk drive having a function of compensating reproduction signals will be explained. FIG. 11 illustrates the construction of the recording/reproduction system of the optical disk drive. The optical disk 10 has a structure in which a super-resolution film 12, an intermediate layer 13, a recording layer 14 and a protective layer 15 are stacked on a disk substrate 11.

The reproduction beam of a power Pr emitted from a light source 21 is introduced via a beam splitter 22 to a first objective lens 23, through which the reproduction beam is incident from the side of substrate 11 onto the optical disk 10 as a fine spot.

The reflected beam from the optical disk 10 passes through the first objective lens 23 in a direction opposite to that of the incident beam and is introduced via the beam splitter 22 into the first photodetector 24 so as to be detected as electric signals. The first photodetector 24 is, for example, a split photodetector whose light-receiving surface is divided in a plurality of sections (for example, two or four sections). A plurality of output signals corresponding to respective divided surfaces are fed to an arithmetic circuit 25, by which a reproduction signal train 26 and an error signals for focusing and tracking are generated.

On the other hand, in order to compensate the reproduction signals, a second objective lens 31, a second photodetector 32 and a compensating circuit 41 are provided. The compensating circuit 41 is designed to compensate the reproduction signal train 26 fed from the arithmetic circuit 25 by referring to the emission detection signals 40 in relative to the emission on the deexcitation of the super-resolution film 12 which is fed from the second photodetector 32.

The compensating operation of the reproduction signals will be explained. The emission from the super-resolution film 12 immediately after the reproduction is converged by the second objective lens 31 and then detected by the second photodetector 32 as electric signals. In this case, adjustment is made such that detection of the emission on the deexcitation of the super-resolution film 12 is performed at $t_d$ second (nearly the time when the emission intensity becomes maximum) after the passing of the reproduction beam emitted from the light source 21. The emission detection signals 40 from the second photodetector 32 is fed to the compensating circuit 41 as reference signals. On the basis of the reference signals, the compensating circuit 41 outputs a reproduction signal train 43 having a compensated waveform of the reproduction signal train 26.

In this case, if the emission intensity on deexcitation of the super-resolution film 12 is very weak, the detection signals from the second photodetector 32 should preferably be integrated.

Figure 12:
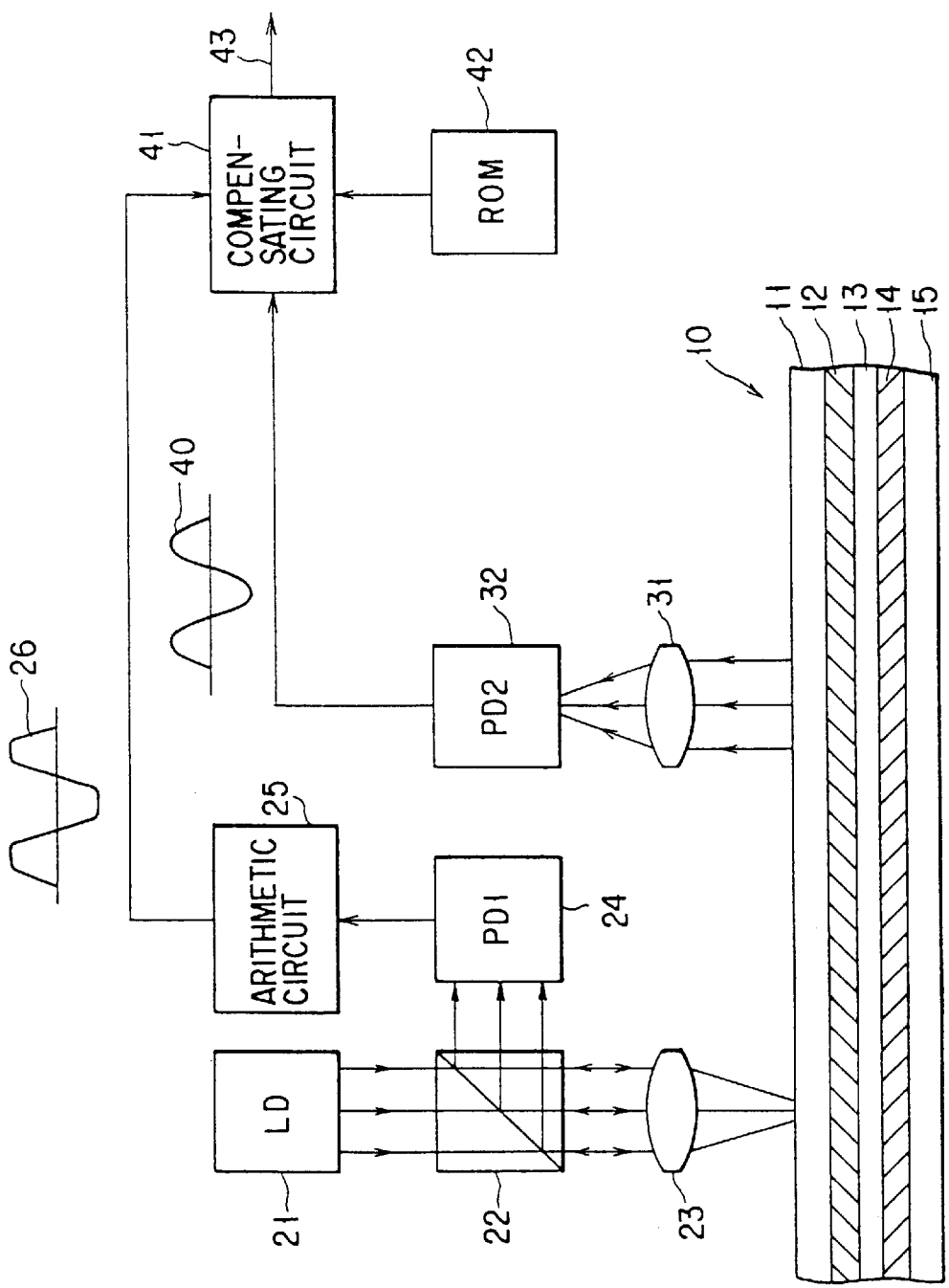
FIG. 12 is a diagram illustrating the construction of another optical disk drive having a reproduction signal compensating function according to the present invention.

FIG. 12 illustrates another example of an optical disk drive having a function of compensating reproduction signals. The optical disk drive is provided with a ROM 42. The ROM 42 stores in advance the characteristic data of the super-resolution film 12, i.e., the relationship between the number of incident photons Np and the transmittance Tr shown in FIG. 10 in the form of a table. The compensating circuit 41 performs compensation of the reproduction signal train 26 according to the characteristic data stored in the ROM 42.

Note that the optical disk according to the present invention may be provided with a first reproduction means and a second reproduction means so as to compensate the intensity of the second reproduction beam emitted from the second reproduction means according to a preliminary reproduction signal train obtained by the first reproduction means. In this case, information recorded in the optical disk can be discriminated and reproduced based on the second reproduction signal train obtained by the second reproduction means.

The present invention can be applied to super-resolution reproduction of a phase change optical disk as well as a magneto-optical disk, a CD-ROM, a CD-R and a WORM.

EXAMPLES

Examples of the present invention will be explained with reference to the drawings hereinafter.

Example 1

First, a super-resolution film alone is formed on a substrate to investigate the property thereof. A glass substrate, an AlSb target and an $SiO_2$ target are set in a magnetron sputtering apparatus. A 100 nm-thick super-resolution film having a structure in which AlSb fine particles are dispersed in an $SiO_2$ matrix is formed on the glass substrate by binary co-sputtering. In the process of the binary co-sputtering, the content of AlSb in the super-resolution is adjusted by controlling the ratio of RF power to be applied to AlSb target and $SiO_2$ target, and at the same time, the size of AlSb fine particles is adjusted by controlling the substrate bias. Specifically, the volume content of AlSb in the super-resolution film is altered in the range of 10 to 100 vol % (the volume content of 100 vol % means an AlSb continuous film), and the particle size of the AlSb fine particles is altered in the range of 0.3 nm (a single molecule) to 25 nm. Note that, $SiO_2$ content mixed in the AlSb fine particles is not more than 20 at %.

In discussing the electron excitation in a semiconductor fine-particle dispersed film, it is theoretically reasonable to compare the content of a semiconductor fine particles by vol %. Therefore, discussion is made herein based on the volume content of semiconductor fine particles.

A laser beam having a wavelength of 650 nm is irradiated in a form of pulse onto the resultant super-resolution film so as to investigate the time response of transmittance by making use of a time-resolved spectrum analyzer. It is found that when the volume contents of AlSb is 75 vol % or more (including 100 vol %, i.e., a continuous film, the excitation efficiency is poor irrespective of the particle size so that it is impossible to obtain a property that transmittance varies quickly. The reason for this is scribed to the fact that the semiconductor fine particles are connected to each other to form a network-like structure, thus making the energy gap of the super-resolution film close to that of a continuous film. The film having such a high volume content of AlSb is not suitable to the super-resolution reproduction for optical disk. The film whose volume content of AlSb is less than 20 vol % indicates a desired property regarding transmittance change with time. However, when the particle size is relatively small even though the volume content of AlSb thereof is less than 20 vol %, it requires several minutes or more for the transmittance which has been raised as a result of the pulse irradiation to return to the initial level. The reason for this is assumed that Stark effect has taken place preferentially. Then the volume content of AlSb in the film is less than 5 vol %, even the magnitude of transmittance change due to the Stark effect is insufficient.

The above Stark effect is a phenomenon that the ground level and the excited level are disturbed (more precisely, the wave function of electron exists in each level is distorted) due to the electric field of the irradiated light, so that the wavelength for transition from the ground level to an excited level is caused to shift. In this case, the electrons in the ground level are not exhausted by irradiation of light, but the absorption coefficient due to electron transition to a specific excited level is lowered and the absorption coefficient due to electron transition to another excited level is increased. Since the Stark effect becomes more prominent as the photo-electric field becomes stronger, the absorbance to a specific wavelength becomes extremely small in the vicinity of the central portion of the light spot, by which an optical aperture is formed. However, in the case of a continuous film or when fine particles are associated with each other, an excited electron tends to move to the neighboring fine particle, so that the Stark effect is hardly expected. Namely, the Stark effect preferentially takes place only when the fine particles are sufficiently dispersed.

By contrast, when the AlSb volume content is not more than 75 vol % and the fine particles have an appropriate particle size, the absorption saturation mainly takes place, thus making it possible to obtain a practical magnitude of change in transmittance and a suitable time response. If the particle size is too large, the time constant of deexcitation is shortened. This is because the effect to maintain stably the excited level by making particles fine is reduced. The lower limit of the particle size is 2 to 3 nm which renders the Stark effect to take place preferentially.

Figure 13:
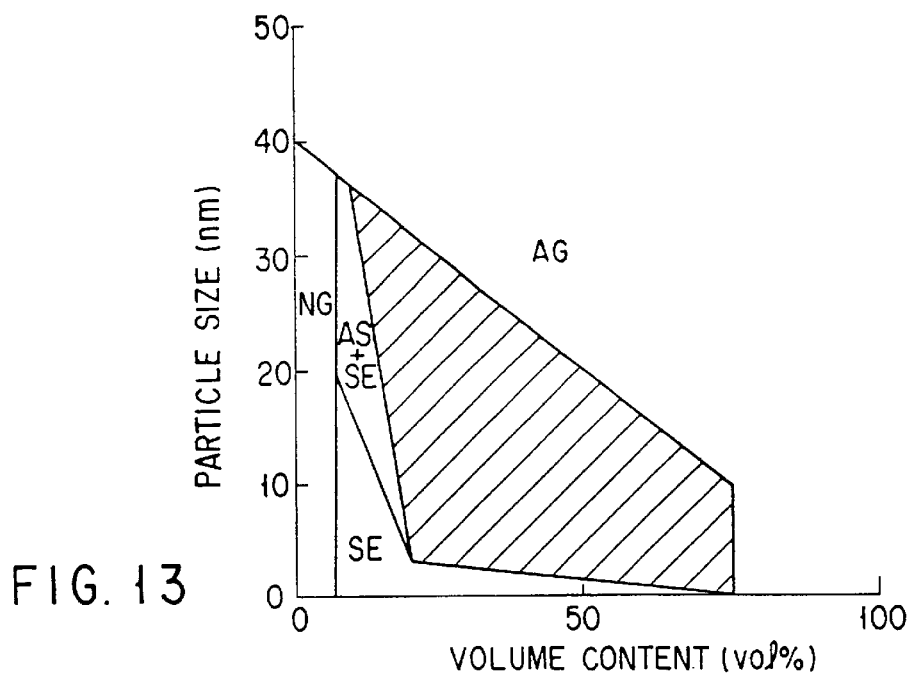
FIG. 13 is a diagram showing a relationship between the volume ratio of AlSb particles and the particle size of the AlSb particles with the super-resolution film in Example 1.

FIG. 13 shows a region where 10% or more of transmittance change and several tens nanometers or more of time constant of deexcitation can be obtained in a super-resolution film in which AlSb fine particles are dispersed in the $SiO_2$ matrix, with the abscissa indicating the volume content and the ordinate indicating the particle size of the particles. In this figure, a region where the absorption saturation takes place preferentially and a desired time response can be obtained is shown by hatching. The region is located below the line passing a point where the volume content is 75 vol % and the particle size is 10 nm, a point where the volume content is 50 vol % and the particle size is 20 nm, and a point where the volume content is 20 vol % and the particle size is 32 nm. This figure also shows a region (AG) where the association of particles is prominent; a region (AS+SE) where both the absorption saturation and the Stark effect take place; a region (SE) where the Stark effect takes place preferentially; and a region (NG) where substantially no change in transmittance can be seen.

Figure 14:
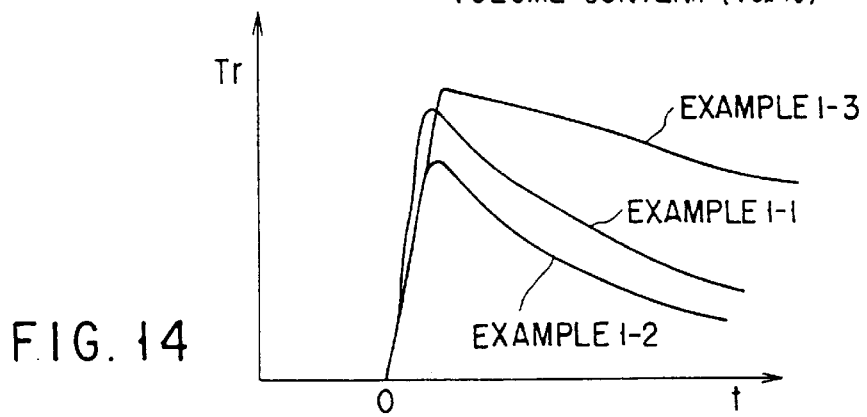
FIG. 14 is a graph showing change with time of transmittance in reproduction of the super-resolution film in Example 1.

Then, based on the above results, plural kinds of super-resolution film, i.e., a super-resolution film containing 60 vol % of AlSb 8 nm in average particle size (Example 1-1); a super-resolution film containing 50 vol % of AlSb 8 nm in average particle size (Example 1-2); and a super-resolution film containing 50 vol % of AlSb 5 nm in average particle size (Example 1-3) were prepared. A laser beam having a wavelength of 650 nm is irradiated in a form of pulse onto these super-resolution films so as to investigate the change with time of transmittance by making use of a time-resolved spectrum analyzer. The results are shown in FIG. 14. In FIG. 14, the time "0" indicates the time when the irradiation of a laser beam having a sufficient intensity to cause absorption saturation has started. It is obvious from this figure that the transmittance which had once raised due to absorption saturation attenuated with time. The period required for raising the transmittance is almost identical with the pulse width of the laser beam, thus indicating an excitation of very high speed. After the irradiation of the laser beam is completed, the transmittance is lowered as a result of deexcitation, returning to the original level prior to the irradiation of the laser beam. The time constant of the deexcitation is 200 ns for Examples 1–1 and 1-2, and 500 ns for Example 1-3. If the time constant is in the aforementioned range, the semiconductor fine particles would be maintained in an excited state at least during the period of irradiating a reproduction beam, thus indicating absorption saturation.

On the other hand, the time required for the FWHM of the reproduction beam spot to pass the surface of the optical disk is about 50 ns under the conditions of 650 nm in wavelength, 0.6 in NA of the objective lens and 3,600 rpm in rotating speed of the optical disk. The rotating speed of optical disk may be possibly increased in future to about 7,200 rpm, twice the current rotating speed. In this condition, the time required for one rotation of the optical disk is 8.3 ms. Namely, even when the reproduction is performed on the same track, the time interval between a first reproduction and a second reproduction is at least 10 times as long as the time constant of the deexcitation. Therefore, it can be concluded that the deexcitation takes place, thus turning the raised transmittance back to the original value, during the time interval after the passing of a reproduction beam spot and before the next reproduction.

As mentioned above, the time constant of the deexcitation can be variously controlled by adjusting the content and particle size of the semiconductor fine particles in a super-resolution film. The lower limit of the time constant of the deexcitation is dependent upon the spot size, so that if the deexcitation takes place remarkably during the irradiation of a reproduction beam spot, the absorption saturation can hardly take place. Therefore, the time constant of the deexcitation should preferably be at least twice the pass time of the full width at half maximum of a reproduction beam spot. When repeated reproduction with a single beam operation is taken into account, the time constant of the deexcitation should preferably be less than ½ of a reproduction interval. Although it depends on the operational conditions such as the rotating speed of the optical disk, the time constant of the deexcitation should preferably be less than 4 ms in general.

In FIG. 14, it will be seen from the comparison between Example 1-1 and Example 1-2, both being the same in particle size with each other but differ in volume content from each other, that the larger the volume content of the fine particles is, the larger the magnitude of change in transmittance and hence more advantageous. It will be seen from the comparison between Example 1-2 and Example 1-3, where they are the same in volume content with each other but differ in particle size from each other, that the time for the deexcitation is longer in Example 1-3 containing the fine particles of smaller particle size because of the prominent effect of fine particles. Moreover, since the time for the deexcitation is longer, the magnitude of change in transmittance is larger. Since it is possible according to the present invention to control suitably the magnitude of transmittance change and the time constant of deexcitation by adjusting the particle size and volume content of semiconductor fine particles within the range defined in FIG. 13, the super-resolution film can be variously designed in accordance with the operational conditions.

Figure 15:
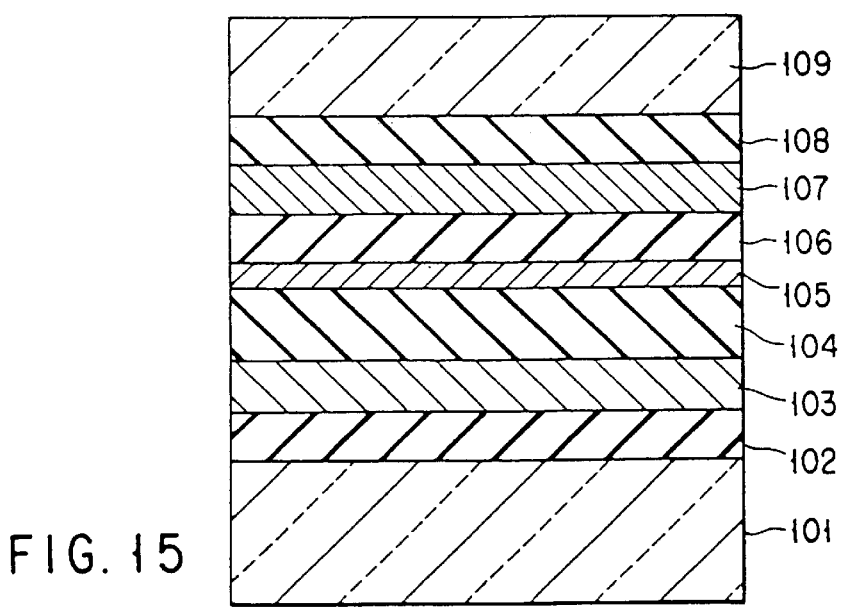
FIG. 15 is a cross-sectional view of the optical disk employed in Example 1.

Next, a phase change optical disk (DVD-RAM) provided with a super-resolution film shown in FIG. 15 will be explained. In FIG. 15, a disk substrate 101 made of polycarbonate is shown, on which the following are formed: a 100 nm-thick Si—N interference layer 102, a 50 nm-thick super-resolution film 103, a 150 nm-thick ZnS—SiO$_2$ upper interference layer 106, and a 50 nm-thick Al—Mo reflective layer 107. Further, a counter substrate 109 is adhered with an adhesive 108 on the Al—Mo reflective layer 107.

The phase change optical disk shown in FIG. 15 can be manufactured by, for instance, the following method. The disk substrate 101 made of polycarbonate on which a tracking groove is formed is placed in a multi-chamber magnetron sputtering apparatus, which is then evacuated. In the first chamber, a B-doped Si target is subjected to reactive DC sputtering in an N$_2$—Ar mixed gas plasma thereby to form the Si—N interference layer 102 having a thickness of 100 nm. In the second chamber, an AlSb target and an SiO$_2$ target are subjected to binary RF co-sputtering in an Ar plasma, with bias sputtering by applying an RF bias to the substrate thereby to form the super-resolution film 103 having a thickness of 50 nm. In this case, the super-resolution films of Examples 1–1 to 1-3 as explained in the aforementioned preliminary experiment can be obtained by adjusting the sputtering conditions. In the third chamber, a ZnS—SiO$_2$ target is subjected to RF sputtering in an Ar plasma to form the ZnS—SiO$_2$ lower interference layer 104 having a thickness of 150 nm. In the fourth chamber, a Ge$_2$Sb$_2$Te$_5$ target is subjected to DC sputtering in an Ar plasma to form the GeSbTe recording layer 105 having a thickness of 20 nm. In the fifth chamber, a ZnS—SiO$_2$ target is subjected to RF sputtering in an Ar plasma to form the ZnS—SiO$_2$ upper interference layer 106 having a thickness of 150 nm. In the sixth chamber, an Al-2 at % Mo target is subjected to DC sputtering in an Ar plasma to form the Al—Mo reflective layer 107 having a thickness of 50 nm. Subsequently, the disk is taken out of the chamber to the atmosphere. Further, the adhesive (a hot-melt adhesive or a UV resin) 108 is spin-coated on the surface of the Al—Mo reflective layer 107, and then the counter substrate 109 is mounted on the adhesive 108, and the adhesive 108 is allowed to cure thereby to manufacture an adhered optical disk.

The Si—N interference layer 102 is not necessary. However, since The Si—N interference layer 102 is effective on increasing the transmittance change of the super-resolution film 103 due to the interference effect, it is preferable to form the Si—N interference layer 102. The counter substrate 109 may be a substrate which is not provided with a film or which is provided with a groove and multilayered films like the disk substrate 101.

An optical disk having the same structure as that of FIG. 15 except that the Si—N interference layer and the super-resolution film are not provided is employed as a comparative example.

The pitch of the groove formed on the disk substrate 101 is determined by taking into consideration the wavelength of laser beam, the NA of the objective lens and the property of super-resolution film. Specifically, the wavelength of laser beam is set to 650 nm and the NA of the objective lens is set to 0.6. Under these conditions, the minimum groove pitch that can be formed in the case of the optical disk not provided with the super-resolution film is about 0.6 µm, whereas in the case of the optical disk provided with the super-resolution film, it is possible to form the groove with the minimum groove pitch of about 0.4 µm while suppressing the cross-talk to a predetermined level. However, in view of the cross-talk in recording, the groove pitch should preferably be set to about 0.5 µm, which is identical with the full width at half maximum of the laser beam spot. The depth of the groove is set to 150 nm (so-called deep groove) in order to reduce cross-talk in reproduction and cross-erase in recording under land/groove recording.

The recording/reproduction characteristics of the optical disks of Examples 1–1 to 1-3 and comparative example will be explained. First, by making use of an initializing apparatus, the recording layer 105 is crystallized all over the surface of disk so as to initialize the disk. Then, the optical disk is set in an optical disk drive provided with a semiconductor laser of 650 nm in wavelength and with an objective lens 0.6 in NA. Overwrite recording is performed under the conditions of 10 m/s in linear velocity of disk, 12 mW in recording power and 6 mW in erasing power. Specifically, the semiconductor laser is operated with a single frequency so as to form a recording marks having a mark length of 0.3 µm with a predetermined mark pitch on a certain track. Then, another recording marks having a mark length of 0.3 µm with a varied mark pitch are formed on a separate track. In this manner, the recording marks are formed by shifting the track to be recorded and varying the mark pitch. In these operations, recording compensation by separating the recording pulse is applied for the purpose of preventing thermal interference.

Figure 16:
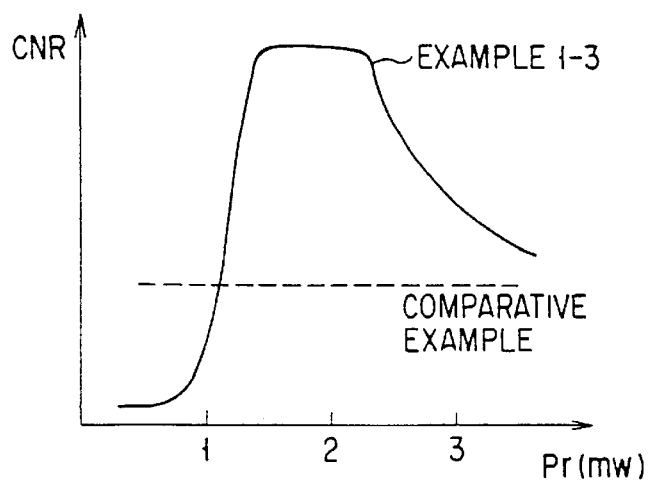
FIG. 16 is a graph showing a relationship between reproduction power and CNR with the optical disk in Example 1.

The recording marks recorded on the optical disk with a mark pitch (MP) of 0.2 µm as mentioned above are then reproduced with various reproduction powers to investigate the reproduction characteristics. FIG. 16 shows a relationship between the reproduction power and the carrier-to-noise ratio (CNR).

In the optical disk of the comparative example, the CNR is very low level, which means that it is impossible to separately reproduce the marks with 0.2 µm mark pitch because of inter-symbol interference. In this case, if the reproduction power is increased, the signal intensity increases correspondingly. However, since the noise level increases at the same time, CNR remains at a low level.

By contrast, in the optical disk of Example 1-3, it is possible to obtain high CNR under a suitable reproduction power. The reason why such characteristics are obtained can be explained as follows. When the reproduction power is less than about 0.7 mW, the super-resolution film does not cause absorption saturation, the transmittance of which remains at a low level, thus making it impossible to obtain signals. When the reproduction power exceeds 0.7 mW, the transmittance of the super-resolution film begins to increase because of absorption saturation, and hence CNR increases gradually. When the reproduction power is about 1.3 to 2.2 mW, the absorption saturation is caused sufficiently thereby to increase prominently the transmittance of the super-resolution film, and hence high CNR can be achieved. However, when the reproduction power is increased further, the optical aperture formed in the super-resolution film becomes too large, so that it is no more possible to discriminate the individual recording marks, and hence CNR is gradually deteriorated. If the reproduction power is increased to about 3 mW or more, the CNR is deteriorated to the same level as that of the comparative example. By the way, as the mark pitch (MP) is made narrow, the range of reproduction power allowing to indicate a constant value of CNR becomes narrow.

Although only the result on Example 1-3 is represented in FIG. 16, the same tendency can be recognized in Examples 1–1 and 1-2. Specifically, Example 1-1 indicates almost the same characteristics as those of Example 1-3. Example 1-2 indicates a lower CNR as compared with Example 1-3, the range of reproduction power for a constant value of CNR is enlarged as compared with Example 1-3, thus making it advantageous in terms of power margin. These results agree with estimation from the results of FIG. 14. Namely, it can be explained from the facts that (a) none of Examples 1–1 to 1-3 substantially cause deexcitation during the period of the irradiation of reproduction beam; (b) Examples 1–1 to 1-3 indicate almost the same degree of transmittance change; and (c) Example 1-2 indicates a smaller transmittance change and forms a smaller optical aperture as compared with Examples 1–1 and 1-3.

Figure 17:
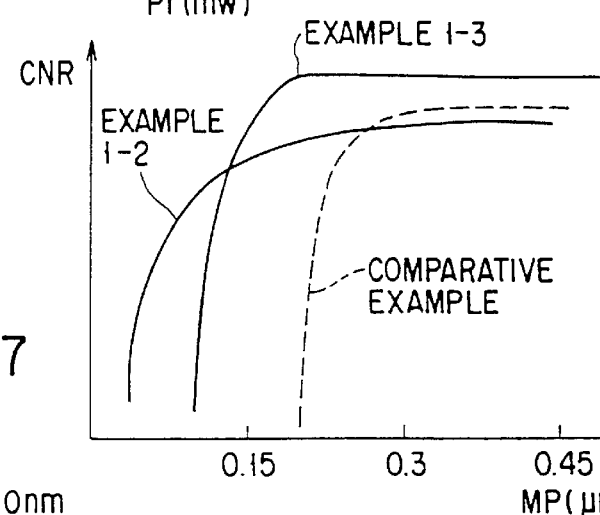
FIG. 17 is a graph showing a relationship between mark pitch and CNR with the optical disk in Example 1.

FIG. 17 shows a relationship between the mark pitch and the CNR when the reproduction is performed by setting the reproduction power so as to allow to obtain a high CNR. In the case of the comparative example, when the mark pitch becomes less than 0.3 µm, the CNR is deteriorated because of an inter-symbol interference. Furthermore, since the cross-talk from the neighboring tracks is large, the CNR can not be enhanced so much even if the mark pitch is enlarged. By contrast, in the case of the optical disk according to Example 1-3, even if the mark pitch is as small as 0.15 µm, a high CNR can be obtained. Furthermore, due to absence of cross-talk, it is possible to obtain a higher CNR, as compared with the comparative example, even if the mark pitch is larger than 0.15 µm. In the case of the optical disk according to Example 1-2, since the magnitude of transmittance change is relatively small, the CNR is relatively low when the mark pitch is large. However, since the size of the optical aperture is small, a relatively high CNR can be obtained even if the mark pitch is smaller than 0.15 µm.

It can be seen from the above results that the magnitude of transmittance change should preferably be enlarged in view of enhancing the CNR, and that the size of the optical aperture should preferably be reduced in view of achieving a high density as well as in view of enlarging the power margin.

Furthermore, the optical disk according to the present invention is advantageous in that it can repeat a large number of reproduction. This is because the optical disk according to the present invention utilizes only electron excitation in principle, so that it is free from thermal fatigue or any deterioration by atomic migration or change in bonding state in contrast with the conventional super-resolution reproduction of heat mode or photon mode.

Example 2

The optical disk having a structure shown in FIG. 15 except that a Be-doped GaP fine-particle dispersed film or a Te-doped GaP continuous film is employed as the super-resolution film will be explained.

The energy gap of the GaP (continuous film) at 0K is 2.35 eV and the wavelength corresponding to the energy gap is 530 nm. When GaP fine particles are dispersed in a matrix, the energy gap is widened depending on the size of the fine particles and on the volume content thereof. As a result, a direct excitation from the valence band to the conduction band can hardly take place as compared with the continuous film. Therefore, electron excitation would not occur in the pure GaP by irradiation of a reproduction beam having a wavelength of 650 nm.

On the other hand, in the case of the Be-doped GaP, a part of the lattice of Ga is replaced by Be and an acceptor level is formed above the valence band. Accordingly, absorption saturation by an electron transition between the valence band and the acceptor level is expected to take place. For example, in the case of an optical disk which employs a super-resolution film in which Be-doped GaP fine particles having an average particle size of 5 nm are dispersed in Si—N matrix at a ratio of 50 vol %, it is possible to perform super-resolution reproduction by making use of a reproduction beam having a wavelength of 650 nm.

In the case of the Te-doped GaP, a part of the lattice of P is replaced by Te and a donor level is formed below the conduction band. Accordingly, absorption saturation by an electron transition between the donor level and the conduction band is expected to take place. For example, in the case of an optical disk which employs a super-resolution film consisting of a Te-doped GaP continuous film, it is possible to perform super-resolution reproduction by making use of a reproduction beam having a wavelength of 650 nm.

Example 3

Only a super-resolution film is formed on a substrate to investigate the property thereof. A glass substrate, a CdSe target and an $SiO_2$ target are set in a magnetron sputtering apparatus, and then a binary co-sputtering is performed while controlling the ratio of RF power applied to CdSe target and $SiO_2$ target, thereby to change the size of CdSe fine particles in the film.

Figure 18:
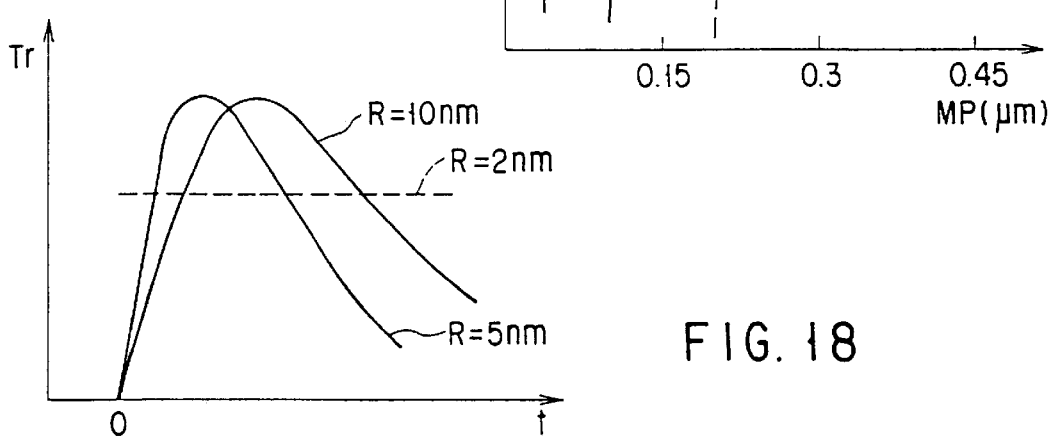
FIG. 18 is a graph showing change with time of transmittance in reproduction in the case where the particle size of semiconductor fine particles is varied with the super-resolution film in Example 3.

First, three kinds of super-resolution films, each containing 50 vol % of CdSe fine particles, and particle size thereof being R=2 nm, R=5 nm and R=10 nm respectively, are prepared. A laser beam having a wavelength of 650 nm is irradiated in a form of pulse onto the super-resolution films so as to investigate the time-response of transmittance by making use of a time-resolved spectrum analyzer. The results shown in FIG. 18 are obtained. In FIG. 18, the point t=0 means a time when the irradiation of a light pulse having a sufficient intensity to cause absorption saturation is initiated.

As shown in FIG. 18, in the samples where the particle size of the CdSe fine particles is R=5 nm or R=10 nm, the time required for the transmittance Tr to be maximum is almost identical to the pulse width of the laser beam, though the sample where the particle size is R=5 nm indicates a slightly shorter time as compared with the sample where the particle size is R=10 nm. It is found from these results that the response of optical excitation is taken place in very high speed. After the irradiation of the laser beam is completed, the transmittance of the super-resolution films is lowered as a result of deexcitation, returning to the original level prior to the irradiation of laser beam. In the sample where the CdSe particle size is R=2 nm, transmittance change is not recognized. The phenomenon can be ascribed to the fact that the energy gap $\epsilon_g$ and the exciton level $\epsilon_{ex}$ are shifted to a higher energy side due to the effect of the fine particles, so that it is impossible to cause the excitation by the wavelength of the reproduction beam, thus allowing the reproduction beam to pass through. In the sample where the CdSe particle size is R=5 nm, only the transition from the valence band to the exciton level takes place by the irradiation of the reproduction beam, thus making the transmittance change very sharp. In the sample where the CdSe particle size is R=10 nm, the optical energy shift by making particles fine is relatively small, so that inter-band transition is caused by the irradiation of the reproduction beam, and hence the transmittance changes through the absorption saturation phenomenon.

Figure 19:
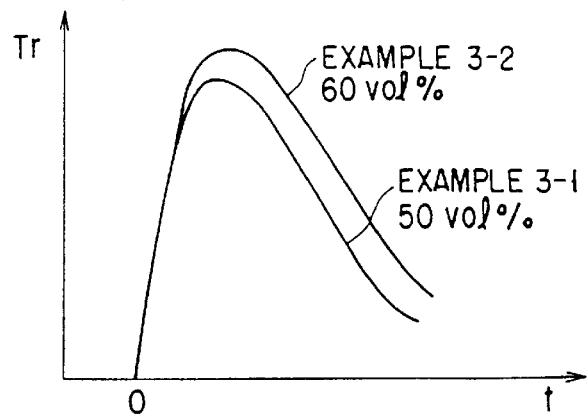
FIG. 19 is a graph showing change with time of transmittance in reproduction in the case where volume content of semiconductor fine particles is varied with the super-resolution film in Example 3.

Then, the particle size R of CdSe fine particles is fixed to 5 nm so as to allow a transition from the valence band to the exciton level to be caused, and the CdSe volume content in the super-resolution is altered in the range of 10 to 100 vol % (100 vol % means a CdSe continuous film). Then, a semiconductor laser beam having a wavelength of 650 nm is irradiated in a form of pulse onto the super-resolution films so as to investigate the time response of transmittance by making use of a time-resolved spectrum analyzer. The results are shown in FIG. 19. In this figure, the point t=0 means a time when the irradiation of a pulse having a sufficient intensity to cause absorption saturation is initiated. In FIG. 19, a sample where the volume content of CdSe in the super-resolution film is 50 vol % is shown as Example 3-1, and a sample where the volume content of CdSe in the super-resolution film is 60 vol % is shown as Example 3-2.

As is apparent from FIG. 19, the higher the volume content of CdSe is, the larger the transmittance change is. In addition, when the magnitude of transmittance change is large, the time required for deexcitation becomes longer. Thus, it is found that the magnitude of transmittance change and the time constant for deexcitation can be adjusted by changing the volume content and particle size of the semiconductor fine particles.

Next, a phase change optical disk shown in FIG. 15 is manufactured in the same manner as in Example 1 except that sample of Example 3-1 or 3-2 in which CdSe fine particles are dispersed in the $SiO_2$ matrix is employed as the super-resolution film. An optical disk having the same structure as that of FIG. 15 except that the Si—N interference layer and the super-resolution film are not provided is also employed as a comparative example in this case.

The recording/reproduction characteristics of the optical disks of Examples 3–1 and 3-2 and comparative example are evaluated. First, by making use of an initializing apparatus, the phase change recording layer (GeSbTe recording layer) is crystallized all over the surface of the disk so as to initialize. Then, the optical disk is set in an optical disk drive provided with a semiconductor laser of 650 nm in wavelength and with an objective lens 0.6 in NA, and then recording marks having a mark length of 0.3 μm are recorded by means of laser beam of single frequency with an overwrite mode while changing the mark pitch under the conditions of 10 m/s in linear velocity of disk, 12 mW in recording power and 6 mW in erasing power. In this case, recording compensation by separating the recording pulse is applied for the purpose of preventing an influence of thermal interference.

Figure 20:
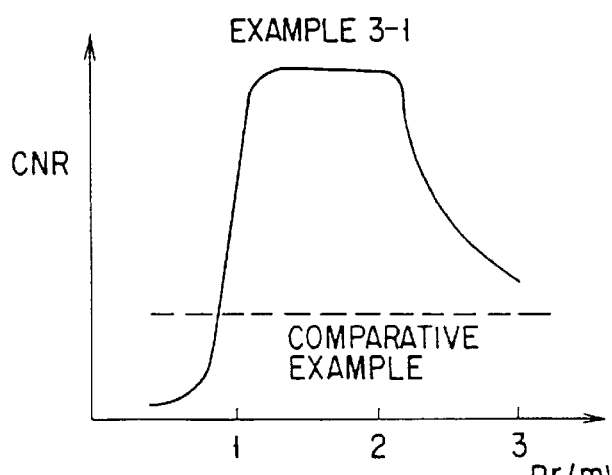
FIG. 20 is a graph showing a relationship between reproduction power and CNR with the optical disk in Example 3.

Reproduction of the recorded optical disks as mentioned above is performed. First, the reproduction of marks formed with a mark pitch (MP) of 0.2 μm is performed while changing the reproduction power. FIG. 20 shows a relationship between the reproduction power and the CNR in the optical disks of Example 3-1 and comparative example.

The optical disk of the comparative example indicates a low CNR. This is because it is impossible to separately reproduce the marks formed with a mark pitch of 0.2 μm due to inter-symbol interference. In this case, if the reproduction power is increased, the intensity of signal can be increased. However, since the noise level is also increased, and hence the CNR is kept remained at a low level.

The results of the reproduction of the optical disk of Example 3-1 are as follows. When the reproduction power is less than about 0.7 mW, the super-resolution film does not cause absorption saturation, the transmittance of which remains at a low level, thus making it impossible to obtain signals. When the reproduction power exceeds 0.7 mW, the transmittance of the super-resolution film begins to increase because of absorption saturation, and hence CNR increases. When the reproduction power is about 1.3 mW, absorption saturation is caused sufficiently thereby to increase prominently the transmittance of the super-resolution film, and hence high CNR can be achieved. Until the reproduction power becomes about 2.2 mW, a high CNR is maintained. When the reproduction power is increased further, the optical aperture formed in the super-resolution film becomes too large, so that it is no more possible to discriminate the individual recording marks, and hence CNR is gradually deteriorated, finally to the same level as that of the comparative example. By the way, as the mark pitch (MP) is made narrow, the range of reproduction power allows to indicate a constant value of CNR becomes narrow.

Figure 21:
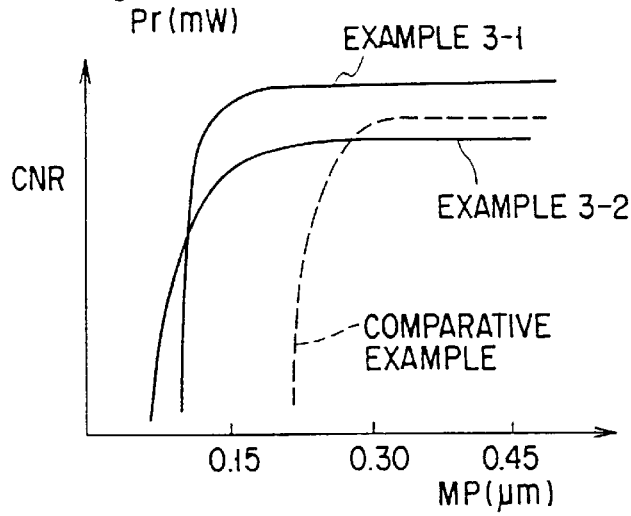
FIG. 21 is a graph showing a relationship between mark pitch and CNR with an optical disk in Example 3.

Then, the reproduction power is set to a predetermined value so as to allow the CNR to indicate a constant value, and the reproduction on tracks differing in mark pitch from each other is performed, thereby to evaluate the high density recording performance. FIG. 21 shows a relationship between the mark pitch and the CNR in the optical disks of Examples 3–1 and 3-2, and comparative example. In the case of the optical disk of comparative example, when the mark pitch becomes less than 0.3 μm, the CNR is deteriorated because of inter-symbol interference. Furthermore, since the cross-talk from the neighboring tracks is large, the CNR can not be enhanced so much even if the mark pitch on the track is enlarged.

By contrast, in the case of the optical disks according to Examples 3–1 and 3-2, even if the mark pitch is as small as 0.15 μm, a high CNR can be obtained. Furthermore, due to absence of cross-talk, it is possible to obtain a higher CNR as compared with the aforementioned comparative example, even if the mark pitch is larger than 0.15 μm. In the case of the optical disk according to Example 3-2, since the magnitude of transmittance change is relatively small, the CNR is relatively low when the mark pitch is large. However, since the size of the optical aperture is small, a relatively high CNR can be obtained even if the mark pitch is made narrow.

It will be seen from the above results that the magnitude of transmittance change should preferably be enlarged in view of enhancing the CNR, and that the size of the optical aperture should preferably be reduced in view of achieving a high density as well as in view of power margin.

Furthermore, the optical disk according to the present invention is advantageous in that it can repeat a large number of reproduction. That is, the optical disk according to the present invention utilizes only electron excitation in principle, so that it is free from thermal fatigue or any deterioration by atomic migration or change in bonding state in contrast with the conventional super-resolution reproduction of heat mode or photon mode, which leads to an excellent stability to repeated reproduction.

Example 4

As described in Example 3, absorption saturation may be caused whether by transition from the valence band to an exciton level or by inter-band transition, depending on a particle size of the fine particles. To confirm the phenomenon, three kinds of optical disks each having the same construction as that of FIG. 15 provided with a super-resolution film containing 50 vol % of CdSe fine particles, the particle size thereof being 2 nm, 5 nm or 10 nm, are manufactured.

These optical disks are irradiated with a reproduction beam by making use of a wavelength variable laser while scanning the wavelength from a longer wavelength side to a shorter wavelength side, and then these optical disks are subjected to reproduction with a weak power than that can cause absorption saturation, thus, investigating the intensity of reproduction signals.

The results regarding the optical disk provided with a super-resolution film containing 50 vol % of CdSe fine particles having a particle size of 5 nm are as follows. Namely, intensity of reproduction signals has a peak in the vicinity of 650 nm (1.91 eV), and, on the shorter wavelength side, it once decreases and then increases gradually as the wavelength is made shorter. The phenomenon is specific to the super-resolution reproduction method based on an electron transition from the ground level to an exciton level $\epsilon_{ex}$ as described with reference to FIG. 4A.

The results regarding the optical disk provided with a super-resolution film containing 50 vol % of CdSe fine particles having a particle size of 2 nm are as follows. Namely, although the intensity of reproduction signals is weak in the vicinity of 650 nm, it has a sharp peak on the shorter wavelength side of 650 nm, and it once decreases and then increased gradually on the further shorter wavelength side. The peak in intensity of the reproduction signals in this case is resulting from exciton absorption.

In the case of the optical disk provided with a super-resolution film containing 50 vol % of CdSe fine particles having a particle size of 10 nm, intensity of reproduction signals has a sharp peak resulting from exciton absorption on the longer wavelength side of 650 nm, and it varies slightly in the vicinity of 650 nm.

Example 5

An optical disk having the same construction as shown in FIG. 15 except that an SiC fine-particle dispersed film is employed as a super-resolution film is manufactured. The energy gap $\epsilon_g$ of SiC is about 3 eV. Since the super-resolution film is caused absorption saturation with a reproduction beam having a wavelength of about 420 nm, it is possible to realize super-resolution reproduction.

It can be found from Examples 4 and 5 that employment of a super-resolution film in which suitable semiconductor fine particles are dispersed allows to realize super-resolution reproduction in a wide range of wavelength.

Example 6

An optical disk having the same construction as shown in FIG. 15 except that a quantum well type super lattice film having a total thickness of 10 nm and constituted by GaInAsP/GaAs is employed as a super-resolution film is manufactured. The energy gap $\epsilon_g$ of GaInAsP/GaAs is about 1.9 eV. Since the super-resolution film is caused absorption saturation with a reproduction beam having a wavelength of about 650 nm, it is possible to realize a super-resolution reproduction.

Example 7

The optical disk employed in this example has a structure as shown in FIG. 1. The disk substrate 11 is made of polycarbonate having a tracking groove formed thereon, on which a semiconductor-particle dispersed type super-resolution film 12; a 150 nm-thick ZnS—SiO$_2$ film, i.e., the first optical interference film as an intermediate layer 13; a 15 nm-thick GeSbTe phase change recording layer as a recording layer 14; and a stack of a 25 nm-thick ZnS—SiO$_2$ film, or a second optical interference film, and an 100 nm-thick AlMo film, or a reflective film, as a protective layer 15 are formed. Adhesion on the substrate 11 after the film formation and initialization are performed according to ordinary methods.

The semiconductor-particle dispersed type super-resolution film has a structure in which fine particles of ZnTe, the band gap of which corresponds to 550 nm, are uniformly dispersed in SiO$_2$ matrix. The super-resolution film is conditioned such that a transition takes place between a defective level formed near the valence band and an exciton level below the conductive band on absorption of light having a wavelength of 650 nm, thus bringing about absorption change or transmittance change. In the super-resolution film, when the intensity of incident light is high enough, the number of electrons in the defective level decreases due to excitation, thereby lowering absorbance and raising transmittance. The life for deexcitation from the exciton level is adjusted to be 10 ns or more by the effect of fine particles, thus making it possible to obtain sufficient transmittance change. Since the intensity of incident light in recording and erasing is very high as compared with that in reproduction, transmittance is made high in most of the regions within a spot, which is almost equivalent to the case where the super-resolution film does not exist in recording and erasing processes.

In this example, films constituting the optical disk 10 other than the super-resolution film 12 are similar to those of the conventional phase-change medium, in which any particular absorbance adjustment is not made. However, it is also possible to adopt an absorbance adjusted film structure by interposing a semitransparent film between the super-resolution film 12 and the first optical interference film, or by employing a semitransparent film in place of the reflective film. In this example, the reflectance (Ra) of the recording mark (an amorphous portion) is lower than the reflectance (Rc) of the unrecorded portion (a crystalline portion).

Verification of the above optical disk 10 is performed according to the following procedures. In the optical disk drive constructed as shown in FIG. 7, the optical disk 10 is allowed to rotate at a linear velocity of 10 m/s by means of a spindle motor (not shown). At the same time, a semiconductor laser of 650 nm in wavelength used as a light source 21 is operated so as to irradiate a light beam onto a predetermined track of the optical disk 10 while performing focusing and tracking servo based on focusing error signals and tracking error signals from the arithmetic circuit connected with the output of the first photodetector 24.

Then, a semiconductor laser as a light source 21 is operated according to a test data (a recording/erasing signal train 20) so as to perform recording of predetermined recording marks on a track of the optical disk 10 and then recorded information is reproduced. In this example, overwriting is performed by means of pulsewave with recording power Pw set to 12 to 14 mW and erasing power Pe set to 7 mW. Reproduction power Pr is set to 1 mW.

Verifying operation in recording and erasing is performed under the above conditions. In this case, the recording/erasing verifying signal train 35 is generated by feeding detection signals from the second photodetector 32 without integration to the comparators 33 and 34 so as to compare the signals with the threshold values TH1 and TH2.

Figure 22:
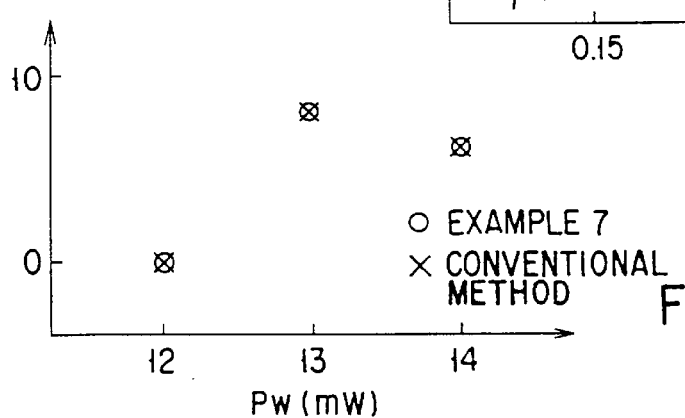
FIG. 22 is a graph showing a relationship between number of writing error and recording power of the optical disk in Example 7.

FIG. 22 illustrates the relationship between the recording power Pw and the number of writing errors in recording detected as the recording/erasing verifying signal train 35. For the purpose of comparison, the number of writing errors is investigated by performing reproduction of recorded region after recording, the result of which is shown as the conventional method in FIG. 22. It will be seen from these results that the number of writing errors detected by this example is the same as that by the conventional method. Since integration of detection signals (integration of light intensity) from the photodetector 32 is not performed in this example as described above, intensity of signals is relatively weak. However, because the number of writing errors detected by this example is found to be the same as that by the conventional method, it is confirmed that the verifying in recording/erasing by utilizing emission on deexcitation can be satisfactorily performed.

Example 8

In this example, employed is an optical disk of the same structure as FIG. 1 having a super-resolution film in which CdSe fine particles are dispersed in an $SiO_2$ matrix. The exciton level of CdSe is equivalent to 680 nm. However, the super-resolution film is conditioned such that the exciton level is shifted to a shorter wavelength side by making particles fine so as to cause a transition from the valence band to an exciton level as it is irradiated with light having a wavelength of 650 nm. The life for deexcitation from the exciton level is adjusted to be 10 ns or more by the effect of making particles fine thus allowing to obtain a sufficient magnitude of transmittance change.

Verifying of the optical disk 10 is performed according to the following procedures. In the optical disk drive constructed as shown in FIG. 7, the optical disk 10 is allowed to rotate at a linear velocity of 10 m/s by means of a spindle motor (not shown). At the same time, a semiconductor laser of 650 nm in wavelength used as a light source 21 is operated so as to irradiate a light beam onto a predetermined track of the optical disk 10 while performing focusing and tracking servo based on focusing error signals and tracking error signals from the arithmetic circuit connected with the output of the first photodetector 24.

Then, a semiconductor laser as a light source 21 is operated according to a test data (a recording/erasing signal train 20) so as to perform recording of predetermined recording marks on a track of the optical disk 10 and then recorded information is reproduced. In this example, overwriting is performed by means of pulsewave with recording power Pw set to 12 to 14 mW and erasing power Pe set to 7 mW. Reproduction power Pr is set to 1 mW.

Verifying operation in recording and erasing is performed under the above conditions. In this case, the recording/erasing verifying signal train 35 is generated by integrating detection signals from the second photodetector 32 for period of ±Δt seconds so as to increase the signal intensity and then by feeding the intensified signals to the comparators 33 and 34 so as to compare the signals with the threshold values TH1 and TH2.

Figure 23:
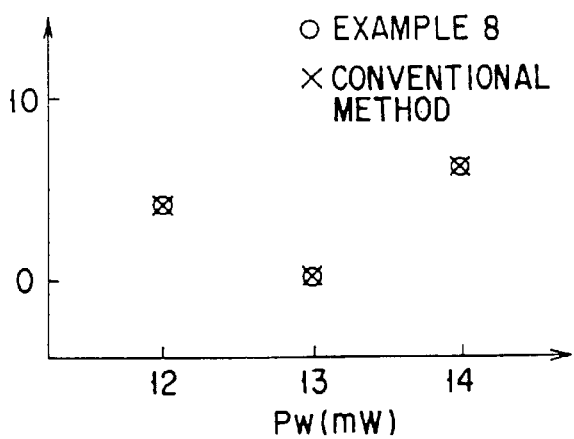
FIG. 23 is a graph showing a relationship between number of write errors and recording power of the optical disk in Example 8.

FIG. 23 illustrates the relationship between the recording power Pw and the number of writing errors in recording detected as the recording/erasing verifying signal train 35. For the purpose of comparison, the number of writing errors is investigated by performing reproduction of recorded region after recording, the result of which is shown as the conventional method in FIG. 23. It will be seen from these results that the number of writing errors detected by this example is the same as that by the conventional method. Because the number of writing errors detected by this example is also found to be the same as that by the conventional method, it is confirmed that the verification in recording/erasing can be satisfactorily performed by utilizing emission on deexcitation.

Example 9

In this example, employed is an optical disk of the same structure as FIG. 1 except that a luminescent film consisting of 3.5 $MgO \cdot 0.5\ MgF_2 \cdot GeO_2:Mn^{2+}$ phosphor is employed in place of a super-resolution film disposed on an incident side with respect to the recording layer.

Verifying of the optical disk 10 is performed according to the following procedures. In the optical disk drive constructed as shown in FIG. 7, the optical disk 10 is allowed to rotate at a linear velocity of 10 m/s by means of a spindle motor (not shown). At the same time, light having a wavelength of 430 nm is generated so as to irradiate a light beam onto a predetermined track of the optical disk 10 while performing focusing and tracking servo based on focusing error signals and tracking error signals from the arithmetic circuit connected with the output of the first photodetector 24. Employed light having a wavelength of 430 nm is the second harmonic of the output of a semiconductor laser as the light source 21 oscillated in an infrared region.

Then, a semiconductor laser as a light source 21 is operated according to a test data (a recording/erasing signal train 20) so as to perform recording of predetermined recording marks on a track of the optical disk 10 and then recorded information is reproduced. In this example, overwriting is performed by means of pulsewave with recording power Pw set to 10 mW and erasing power Pe set to 6 mW. Reproduction power Pr is set to 1 mW.

Verifying operation in recording and erasing is performed under the above conditions. In this case, the recording/erasing verifying signal train 35 is generated by integrating detection signals from the second photodetector 32 for period of ±Δt seconds so as to increase the signal intensity and then by feeding the intensified signals to the comparators 33 and 34 so as to compare the signals with the threshold values TH1 and TH2.

When the relationship between the recording power Pw and the number of writing errors in recording detected as the recording/erasing verifying signal train 35 is investigated, it proved that it is the same as that by the conventional method in which reproduction of recorded region is performed after recording. Therefore, it is confirmed that the verification in recording/erasing can be satisfactorily performed by utilizing emission from the luminescent film.

Example 10

An optical disk of the same structure as employed in Example 7 is employed to perform compensation of reproduction signals according to the following procedures.

In the optical disk drive constructed as shown in FIG. 11, the optical disk 10 is allowed to rotate at a linear velocity of 10 m/s by means of a spindle motor (not shown). At the same time, a semiconductor laser of 650 nm in wavelength used as a light source 21 is operated so as to irradiate a light beam onto a predetermined track of the optical disk 10 while performing focusing and tracking servo based on focusing error signals and tracking error signals from the arithmetic circuit connected with the output of the first photodetector 24.

Then, a semiconductor laser as a light source 21 is operated according to a test data (a recording/erasing signal train 20) so as to perform recording of predetermined recording marks on a track of the optical disk 10 and then recorded information is reproduced. In this example, overwriting recording is performed under overwrite mode of 12 mW in recording power Pw and 7 mW in erasing power Pe, while changing the mark pitch by 0.67 to 0.33 μm (0.4 to 0.2 μm in bit pitch) with single frequency for each track. The recording is performed plural times for each track thereby to measure the CNR and erasure ratio.

In recording/reproduction test performed on an optical disk without a super-resolution film which is manufactured as a comparative example, CNR of 54 dB and an erasure ratio of −33 dB are obtained when the mark pitch is 0.67 μm, both values being satisfactory in practical use, but both values of CNR and erasure ratio are deteriorated when the mark pitch is reduced to 0.6 μm or less. In a phase change medium where any absorbance adjustment is not made like this comparative example, overwrite jitters increases as well as inter-symbol interference between the neighboring marks is enlarged. Therefore, when the super-resolution reproduction is not adopted, the liner density is limited to that corresponding to a mark pitch of 0.58 μm (0.35 μm in bit pitch). By the way, even in the case where the super-resolution film is not provided, the absorbance adjusted optical disk allows to improve the liner density to that corresponding to a mark pitch of 0.5 μm (0.3 μm in bit pitch).

Then, reproduction of the optical disk on which recording marks are formed as mentioned above is performed according to the following procedures. When a super-resolution reproduction is performed, the number of photons (Np in FIG. 10) incident on the super-resolution film 12 in reproduction has an importance, so that an optimum power is determined at first. Namely, reproduction is performed regarding recording marks formed with a mark pitch of 0.4 μm while changing reproduction power Pr, and the power by which a maximum reproduction CNR is obtained is selected as an optimum reproduction power. Note that, if the super-resolution film is not provided, even an absorbance adjusted optical disk cannot provide a sufficient CNR in reproduction of such recording marks. The CNR obtained in this case is higher than that of the conventional optical disk not provided with a super-resolution film (including a disk comprising absorbance adjusted films), thus indicating that the super-resolution film 12 employed in this example sufficiently functions to reduce inter-symbol interference.

However, as far as signal level is concerned, it is certainly possible to discriminate and reproduce the marks of narrow pitch, whereas the noise level is relatively high, and hence the CNR is not sufficient for practical use. The reproduction signal train 26, which is generated by the arithmetic circuit 25 from the detection signals obtained from the first photodetector 24, has a waveform in which signals from the unrecorded portion (crystalline portion) of a higher reflectance are enhanced as compared with those from the recording marks (amorphous portion) of a lower reflectance as well as exhibits prominent noises at the leading and trailing edges as shown in FIG. 11, although the recording signals form a sine wave of a single frequency. The cause for the noises in the reproduction signal train 26 can be attributed to the change of the optical aperture formed in the super-resolution film 12 due to recording states (the presence or absence of a recording mark), as mentioned above.

On the other hand, the emission detection signals 40, which are obtained by converging emission on deexcitation of the super-resolution film 12 with a first objective lens 31, followed by detecting with the second photodetector 32, correspond to the presence or absence of the recording mark on the recording layer 14. The waveform of the reproduction signal train 26 is compensated by means of a compensating circuit 41 based on the emission detection signals 40. Specifically, letting the effective intensities of light toward the super-resolution film 12 when a reproduction beam spot is incident on the amorphous portion and on the crystalline portion of the recording layer 14 be Ia* and Ic* respectively, they are approximately represented by the following equations:

$$Ia^* = (1 + Tr1 \times Ra)Io$$

$$Ic^* = (1 + Tr2 \times Rc)Io$$

wherein Io denotes the intensity of a reproduction light emitted from the light source 21; Ra and Rc are reflectances of the amorphous portion and crystalline portion of the recording layer 14; and Tr1 and Tr2 are transmittances of the super-resolution film 12 when the reproduction light having an intensity of Io is reflected at the reflectances of Ra and Rc, followed by being incident on the super-resolution film 12, respectively. These values can be calculated in advance.

The compensating circuit 41 determines compensation signals by calculation using the following compensation coefficients: a coefficient of $1/Io(1+Tr1 \times Ra)$ for the bottom of the reproduction signal train 26 (a portion corresponding to the intensity of reflected light from the amorphous portion); a coefficient of $1/Io(1+Tr2 \times Rc)$ for the peak of the reproduction signal train 26 (a portion corresponding to the intensity of reflected light from the crystalline portion); and a coefficient of an arithmetical mean of $1/Io(1+Tr2 \times Rc)$ and $1/Io(1+Tr2 \times Rc)$ for a point between the bottom and the peak of the reproduction signal train 26. Then, the reproduction signal train 26 is compensated by making use of the compensation signals.

The reproduction signal train 43 compensated by the compensating circuit 41 forms a waveform of a single frequency nearly the same as that of the recording signal with only slightly distorted. By feeding the reproduction signal train 43 to a reproduction signal processing system (not shown) so as to perform discrimination and reproduction of the original information, it is possible to perform excellent reproduction with low error rate even with respect to recording marks formed with narrow pitch. It is found possible to perform a sufficiently stable operation for the mark pitch of 0.33 μm.

Example 11

An example of compensating a reproduction signal train 26 according to the characteristics data of the super-resolution film 12 (a relationship between the number of incident photons Np and the transmittance Tr shown in FIG. 10) which is stored in a ROM 42 as shown in FIG. 12 will be explained.

In this example, like Example 10, compensation signals are determines by calculation using the following compensation coefficients: a coefficient of $1/Io(1+Tr1 \times Ra)$ for the bottom of the reproduction signal train 26 (a portion corresponding to the intensity of reflected light from the amorphous portion); a coefficient of 1/Io(1+Tr2×Rc) for the peak of the reproduction signal train 26 (a portion corresponding to the intensity of reflected light from the crystalline portion); and a coefficient of an arithmetical mean of 1/Io (1+Tr2×Rc) and 1/Io(1+Tr2×Rc) for a point between the bottom and the peak of the reproduction signal train 26, and then the reproduction signal train 26 is compensated by making use of the compensation signals. However, in contrast to Example 10, transmittances Tr1 and Tr2 employed in this example are determined from the characteristics of the super-resolution film 12 stored in the ROM 42.

Specifically, since the number of photons enters the super-resolution film 12 varies depending on the recording states of the recording layer as mentioned above, the level of the reproduction signal train 26 also varies in the same manner, different from the original level depending only on the reflectance change of the recording layer 14. In this example, by generating an address of the ROM 42 with the arithmetic circuit 41 corresponding with the level of the reproduction signal train 26, the transmittance data corresponding to the level of the reproduction signal train 26 or the number of photons incident on the super-resolution film 12 can be read out.

Namely, while the relationship between the number of incident photons Np and the transmittance Tr shown in FIG. 10 is employed in linear approximation in Example 10, the relationship between the actual values of Np and Tr are employed for compensating the reproduction signal train 26 in this example, thus it allows to reproduce the original signal waveform more precisely as a compensated reproduction signal train 43.

Example 12

Figure 24:
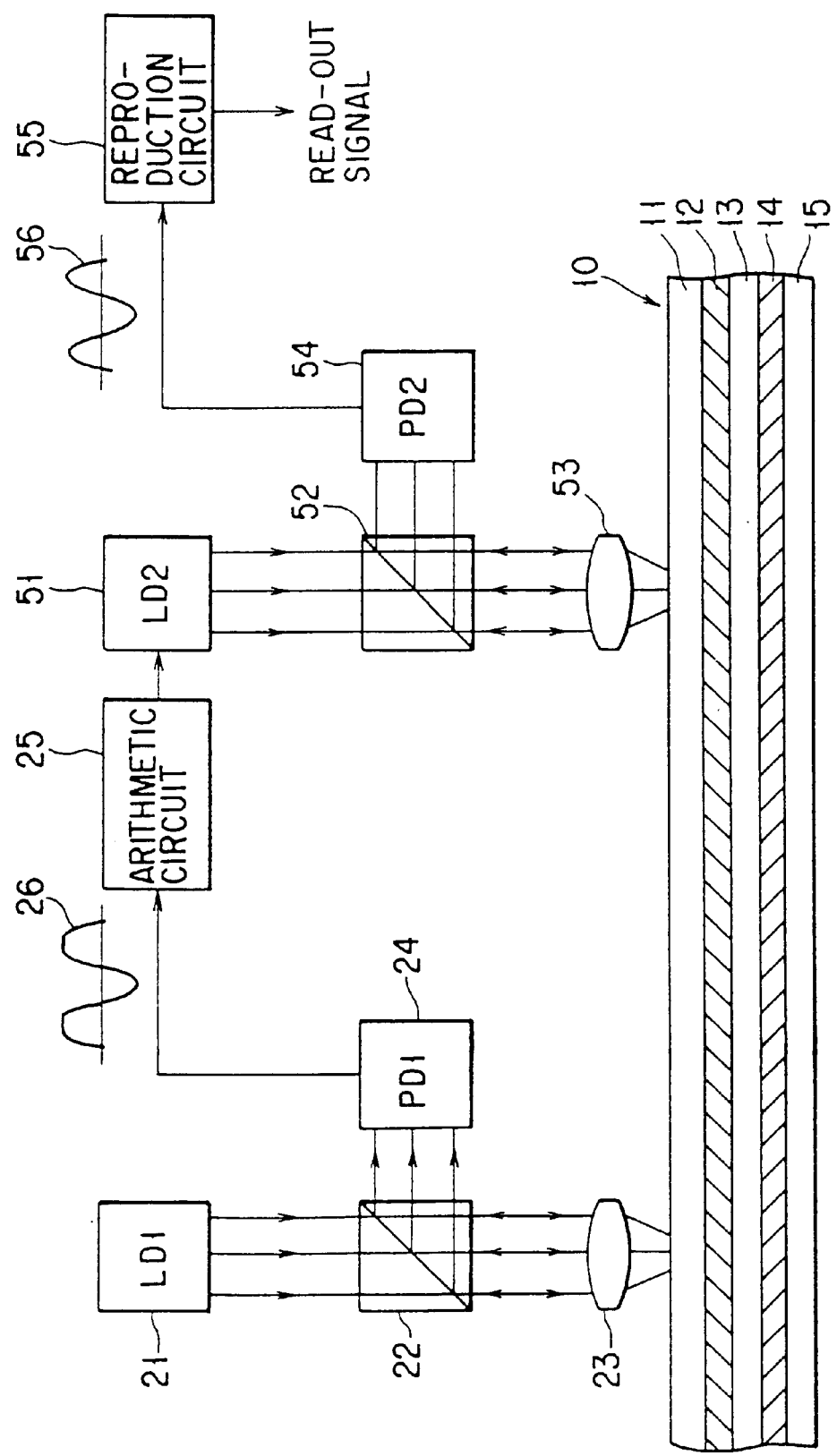
FIG. 24 is a diagram illustrating the construction of recording/reproduction system in the optical disk drive in Example 12.

FIG. 24 shows the construction of the recording/reproduction system of an optical disk drive according to this Example.

In this example, a couple of reproduction systems are employed: a first reproduction system is designed for performing reproduction by making use of a reproduction beam of predetermined intensity, thereby generating a first reproduction signal train; and a second reproduction system is designed for performing reproduction by making use of a second reproduction beam whose intensity is corrected according to the first reproduction signal train by means of the first reproduction system, thereby generating a second reproduction signal train, from which the information recorded in an optical disk is discriminated and reproduced.

In FIG. 24, the optical disk 10 has a structure in which a super-resolution film 12, an intermediate layer 13, a recording layer 14 and a protective layer 15 are formed subsequently on a disk substrate 11. The intermediate layer 13 and the protective layer 15 may be formed if desired. Recording marks in accordance with recording information are formed on the recording layer 14.

For the purpose of reproducing the information recorded in the optical disk 10, the apparatus according to this example is provided with a first reproduction system comprising a first light source 21, a first beam splitter 22, a first objective lens 23 and a first photodetector 24 as well as a second reproduction system comprising a second light source 51, a second beam splitter 52, a second objective lens 53 and a second photodetector 54. There is also provided with an arithmetic circuit 26 between the first reproduction system and the second reproduction system. Namely, a first reproduction signal train 26 obtained from the first photodetector 24 as an output of the first reproduction system is fed to the arithmetic circuit 26, by which correction signals are generated as mentioned below, and then the: intensity of reproduction beam to be generated from the second light source 51 is controlled for correction according to correction signals.

In reproduction, a preliminary reproduction is performed at first by the first reproduction system. Namely, a reproduction beam of predetermined intensity emitted from the first light source 21 is introduced via the first beam splitter 22 to the first objective lens 23, by means of which the reproduction beam is irradiated onto the optical disk 10 from the substrate 11 side as a fine spot.

A reflected beam from the optical disk 10 passes through the first objective lens 23 in a direction opposite to that of the incident beam and introduced via the beam splitter 22 into the first photodetector 24 so as to be detected as electric signals. The first photodetector 24 is, for example, a split photodetector whose light-receiving surface is divided in a plurality of sections (for example, two or four sections). By adding or subtracting the plurality of output signals corresponding to respective divided surfaces, reproduction signals or error signals for focusing and tracking are generated. The first photodetector 24 involves a function of adder-subtracter.

The reproduction signals (the first reproduction signal train 26) supplied from the first photodetector 24 are introduced to the arithmetic circuit 25. The arithmetic circuit 25 monitors the recording states of the recording layer 14 explained with reference to FIG. 9 from the first reproduction signal train 26, thereby modulating the intensity of the reproduction beam from the second light source 31 for correction. As a result of this correction, it allows for the second reproduction system as explained hereinafter to generate reproduction signals free from distorted components due to change in the optical aperture in the super-resolution film 12 depending on the recording states of the recording layer 14. The processing by the arithmetic circuit 25 will be explained hereinafter.

The final reproduction process is performed by means of the second reproduction system comprising the second light source 31, the intensity of which has been corrected by the arithmetic circuit 25. Namely, the reproduction beam from the second light source 51, the intensity of which has been corrected by correction signals from the arithmetic circuit 25, is introduced via the second beam splitter 52 to the second objective lens 53, by means of which the reproduction beam is irradiated onto the optical disk 10 from the substrate 11 side as a fine spot.

Like the first reproduction system, a reflected beam from the optical disk 10 passes through the second objective lens 53 in a direction opposite to that of the incident beam and introduced via the beam splitter 52 into the second photodetector 54 so as to be detected as electric signals. Like the first photo-detector 24, the second photodetector 54 is, for example, a split photodetector whose light-receiving surface is divided in a plurality of sections (for example, two or four sections). By adding or subtracting the plurality of output signals corresponding to respective divided surfaces, reproduction signals or error signals for focusing and tracking are generated. Like the first photodetector 24, the second photodetector 54 involves a function of adder-subtracter.

The reproduction signal (the second reproduction signal train 56) supplied from the second photodetector 54 is introduced to the arithmetic circuit 55, by which the information recorded in the optical disk 10 is discriminated and reproduced, thus obtaining reproduction information.

Next, the details of each component of this example will be further explained.

The optical disk 10 comprises the disk substrate 11 made of polycarbonate having a tracking groove formed thereon, on which a semiconductor-particle dispersed type super-resolution film 12; a 150 nm-thick ZnS—SiO$_2$ film, i.e., the first optical interference film as an intermediate layer 13; a 15 nm-thick GeSbTe phase change recording layer as a recording layer 14; and a stack of a 25 nm-thick ZnS—SiO$_2$ film, or a second optical interference film, and an 100 nm-thick AlMo film, or a reflective film, as a protective layer 15 are formed. Adhesion on the substrate 11 after the film formation and initialization are performed according to ordinary methods.

The semiconductor-particle dispersed type super-resolution film has a structure in which fine particles of ZnTe, the band gap of which corresponds to 550 nm, are uniformly dispersed in SiO$_2$ matrix. The super-resolution film is conditioned such that a transition takes place between a defective level formed near the valence band and an exciton level below the conductive band on absorption of light having a wavelength of 650 nm, thus bringing about absorption change or transmittance change.

In the super-resolution film, when the intensity of incident light is high enough, the number of electrons in the defective level decreases due to excitation, thereby lowering absorbance and raising transmittance. The life for deexcitation from the exciton level is adjusted to be 10 ns or more by the effect of making particles fine, thus making it possible to obtain sufficient transmittance change. Since the intensity of incident light in recording and erasing is very high as compared with that in reproduction, transmittance is made high in most of the regions within a beam spot, which is almost equivalent to the case where the super-resolution film does not exist in recording and erasing processes.

In this example, films constituting the optical disk 10 other than the super-resolution film 12 are similar to those of the conventional phase-change medium, in which any particular absorbance adjustment is not made. However, it is also possible to adopt an absorbance adjusted film structure by interposing a semitransparent film between the super-resolution film 12 and the intermediate film 13 or the first optical interference film, or by employing a semitransparent film in place of the reflective film. In this example, the reflectance (Ra) of the recording mark portion (an amorphous portion) is lower than the reflectance (Rc) of the unrecorded portion (a crystalline portion).

Super-resolution reproduction is performed using the optical disk 10 constructed as mentioned above according to the following procedures.

In the optical disk drive constructed as shown in FIG. 24, the optical disk 10 is allowed to rotate at a linear velocity of 10 m/s by means of a spindle motor (not shown). At the same time, a semiconductor laser of 650 nm in wavelength used as a light source 21 is operated so as to irradiate a reproduction beam onto a predetermined track of the optical disk 10 while performing focusing and tracking servo based on focusing error signals and tracking error signals output from the first photodetector 24. In this case, since the NA of the first objective lens 23 is set to 0.6, the size of the reproduction beam spot on the optical disk 10 is about 0.89 μm in e$^{-2}$ and 0.5 μm in FWHM.

Then, a semiconductor laser as a light source 21 is operated according to a test data (a recording/erasing signals) so as to perform recording of predetermined recording marks onto a track of the optical disk 10 and then recorded information is reproduced. In this example, overwriting recording is performed under overwrite mode of 12 mW in recording power Pw and 7 mW in erasing power Pe, while changing the mark pitch by 0.67 to 0.33 μm (0.4 to 0.2 μm in bit pitch) with single frequency for each track. Recording is performed plural times for each track thereby to measure the CNR and erasure ratio.

In recording/reproduction test performed on an optical disk without a super-resolution film which is manufactured as a comparative example, CNR of 54 dB and an erasure ratio of −33 dB are obtained when the mark pitch is 0.67 μm, both values being satisfactory in practical use, but both values of CNR and erasure ratio are greatly deteriorated when the mark pitch is made narrow to 0.6 μm or less. In a phase change medium where any absorbance adjustment is not made like this comparative example, overwrite jitters increases as well as inter-symbol interference between the neighboring marks is enlarged. Therefore, when the super-resolution reproduction is not adopted, the liner density is limited to that corresponding to a mark pitch of 0.58 μm (0.35 μm in bit pitch). By the way, even in the case where the super-resolution film is not provided, the absorbance adjusted optical disk allows to improve the liner density to that corresponding to a mark pitch of 0.5 μm (0.3 μm in bit pitch).

Then, reproduction of the optical disk on which recording marks are formed as mentioned above is performed according to the following procedures. When a super-resolution reproduction is performed, the number of photons (Np in FIG. 10) incident on the super-resolution film 12 in reproduction has an importance, so that an optimum power is determined at first. Namely, reproduction is performed regarding recording marks formed with a mark pitch of 0.4 μm while changing reproduction power, and the power by which a maximum reproduction CNR is obtained is selected as an optimum reproduction power. Note that, if the super-resolution film is not provided, even an absorbance adjusted optical disk cannot provide a sufficient CNR in reproduction of such recording marks. The CNR obtained in this case is higher than that of the conventional optical disk not provided with a super-resolution film (including a disk comprising absorbance adjusted films), indicating that the super-resolution film 12 employed in this example sufficiently functions to reduce inter-symbol interference.

However, as far as signal level is concerned, it is certainly possible to discriminate and reproduce the marks of narrow pitch, whereas the noise level is relatively high, and hence the CNR is not sufficient for practical use. The reproduction signal train 26, which is output from the first photodetector 24, has a waveform in which signals from the unrecorded portion (crystalline portion) of a higher reflectance are enhanced as compared with those from the recording mark portion (amorphous portion) of a lower reflectance as well as exhibits prominent noises at the leading and trailing edges, although the recording signals form a sine wave of a single frequency. The cause for the noises in the reproduction signal train 26 can be attributed to the change of the optical aperture formed in the super-resolution film 12 due to recording states (the presence or absence of a recording mark), as mentioned above.

The first reproduction signal train 26 is fed to the arithmetic circuit 25 so as to generate correction signals for correcting the intensity of reproduction beam from the second light source 51 as follows.

Now, letting the effective intensities of light toward the super-resolution film 12 when a reproduction beam spot from the first light source is incident on the amorphous portion and on the crystalline portion of the recording layer 14 be Ia* and Ic* respectively, they are approximately represented by the following equations:

$$Ia^* = (1 + Tr1 \times Ra)Io$$

$$Ic^* = (1 + Tr2 \times Rc)Io$$

wherein Io denotes the intensity of a reproduction light emitted from the first light source 21; Ra and Rc are reflectances of the amorphous portion and crystalline portion of the recording layer 14; and Tr1 and Tr2 are transmittances of the super-resolution film 12 when the reproduction light having an intensity of Io is reflected at the reflectances of Ra and Rc, followed by being incident on the super-resolution film 12, respectively. These values can be calculated in advance.

The arithmetic circuit 25 determines correction signals by calculation using the following correction coefficients: a coefficient of 1/Io(1+Tr1×Ra) for the bottom of the reproduction signal train 26 (a portion corresponding to the intensity of reflected light from the amorphous portion); a coefficient of 1/Io(1+Tr2×Rc) for the peak of the reproduction signal train 26 (a portion corresponding to the intensity of reflected light from the crystalline portion); and a coefficient of an arithmetical mean of 1/Io(1+Tr2×Rc) and 1/Io(1+Tr2×Rc) for a point between the bottom and the peak of the reproduction signal train 26. Then, the correction signals is used for controlling the second light source 51 so as to correct the reproduction beam emitted from the light source 51.

In the operation of correction, the correction signals are delayed by the time required for the optical disk 10 to move a distance between the first objective lens 23 and the second objective lens 53, and then applied to the semiconductor laser used as the second light source 51.

The intensity (Io') of the reproduction beam from the second light source 51 is modulated by the correction signals from the arithmetic circuit 25, within the range between Io'/Io(1+Tr1×Ra) and Io'/Io(1+Tr2×Rc) synchronously with the first reproduction signal train 26. The modulated reproduction beam is then irradiated via the second beam splitter 52 and the second objective lens 53 onto the optical disk 10. As a result, a relatively intense reproduction beam is incident on the amorphous portion of the recording layer 14, while a relatively weak reproduction beam is incident on the crystalline portion of the recording layer 14, thus the effective intensity of incident light onto the super-resolution film 12 can be maintained constant. In this case, the wavelength of the second light source 51 and the NA of the second objective lens 53 are made identical with those of the first light source 21 and the first objective lens 23, respectively.

By controlling the intensity of reproduction beam from the second light source 51 as described above, the second reproduction signal train 56 from the second photodetector 54 of the second reproduction system comes to form a waveform of single frequency nearly the same as that of the recording signal with low noise and low distortion. By feeding the second reproduction signal train 56 to the reproduction circuit 55, it is possible to perform excellent reproduction with low error rate even with respect to recording marks formed with narrow pitch. It is found possible to perform a sufficiently stable operation for the mark pitch of 0.33 µm.

The arithmetic circuit 25 in this example may be constituted by a linear amplifier whose input/output characteristics are designed to have aforementioned correction coefficients. A delay circuit for delaying the correction signals, as described above, may be incorporated into the arithmetic circuit 25 or installed separately.

Example 13

Figure 25:
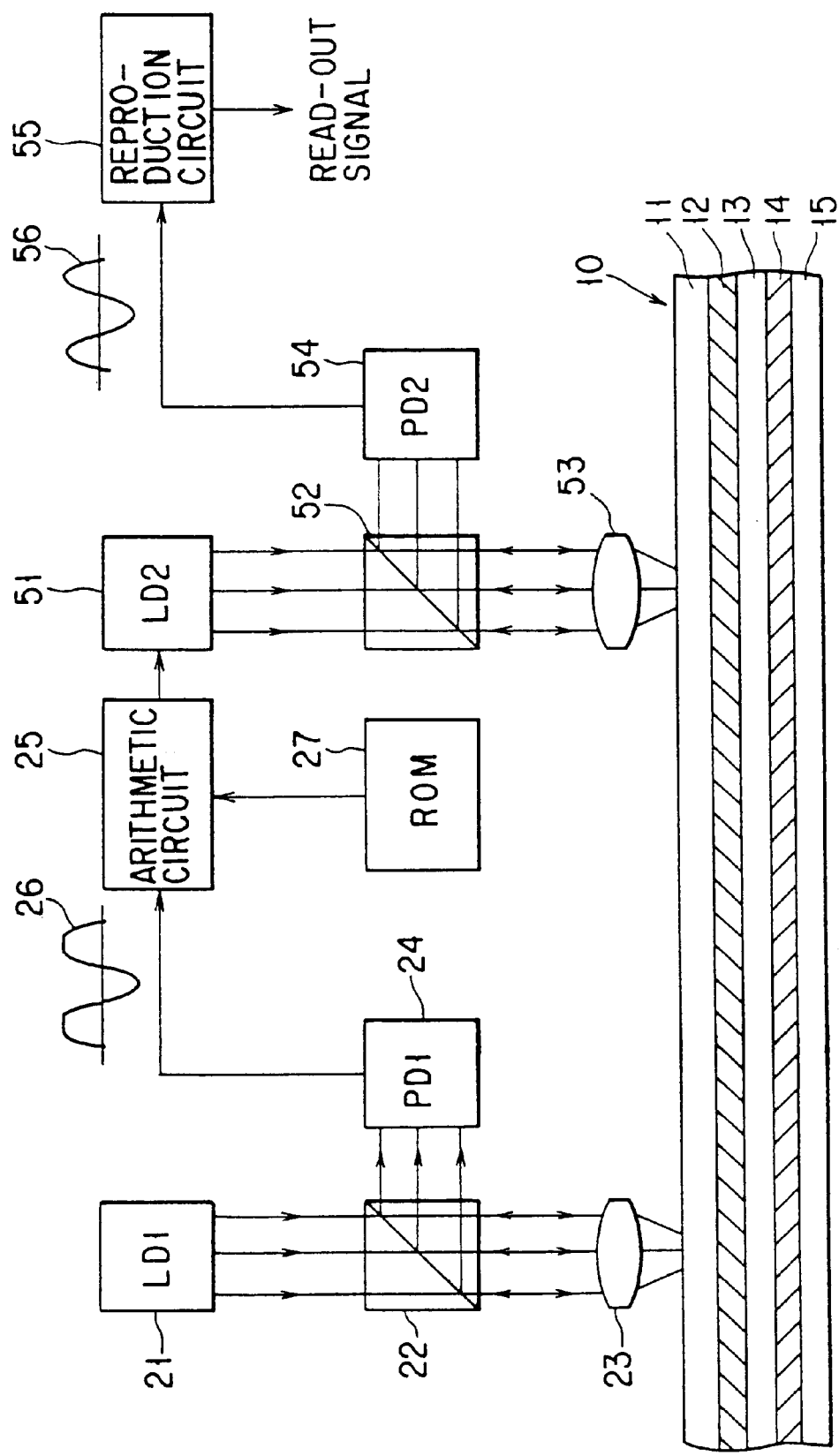
FIG. 25 is a diagram illustrating the construction of recording/reproduction system in the optical disk drive in Example 13.

FIG. 25 shows the construction of the recording/reproduction system of an optical disk drive according to this Example. As shown in this figure, the construction in this Example has a ROM 27 in addition to the construction of Example 12. In the ROM 27, characteristic data of the super-resolution film 12, specifically, the relationship between the number of incident photons Np and the transmittance Tr as shown in FIG. 10 is stored in the form of table.

In this example, like Example 12, the intensity (Io') of the reproduction beam from the second light source 51 is modulated by the correction signals from the arithmetic circuit 25, within the range between Io'/Io(1+Tr1×Ra) and Io'/Io(1+Tr2×Rc) synchronously with the first reproduction signal train 26. However, in contrast to Example 12, transmittances Tr1, Tr2 and the data between these transmittances read out from the ROM 27 are employed in this example.

Specifically, since the number of photons enters the super-resolution film 12 varies depending on the recording states of the recording layer as mentioned above, the level of the first reproduction signal train 26 also varies in the same manner, different from the original level depending only on the reflectance change of the recording layer 14. In this example, by generating an address of the ROM 27 with the arithmetic circuit 25 corresponding with the level of the reproduction signal train 26, the transmittance data corresponding to the level of the first reproduction signal train 26 or the number of photons incident on the super-resolution film 12 can be read out.

Namely, while the relationship between the number of incident photons Np and the transmittance Tr shown in FIG. 10 is employed in linear approximation in Example 12, the relationship between the actual values of Np and Tr are employed for correcting the intensity of the reproduction beam from the second light source 51 in this example, thus it allows to reproduce the original signal waveform more precisely as a second reproduction signal train 56.

In this example, the shape of the optical aperture in the super-resolution film 12 may be calculated in advance on the basis of the relationship between the number of photons Np and the transmittance Tr shown in FIG. 10 as well as the first reproduction signal train 26, and the calculated data may be stored in the ROM 27 so as to make it possible to correct more strictly the intensity of reproduction beam from the second light source 51.

The arithmetic circuit 26 may be constituted by making use of DSP (digital signal processing circuit). In this case, the reproduction circuit 55 also performs digital processing, and therefore arithmetic circuit 25 and reproduction circuit 55 may be integrated.

Example 14

Figure 26:
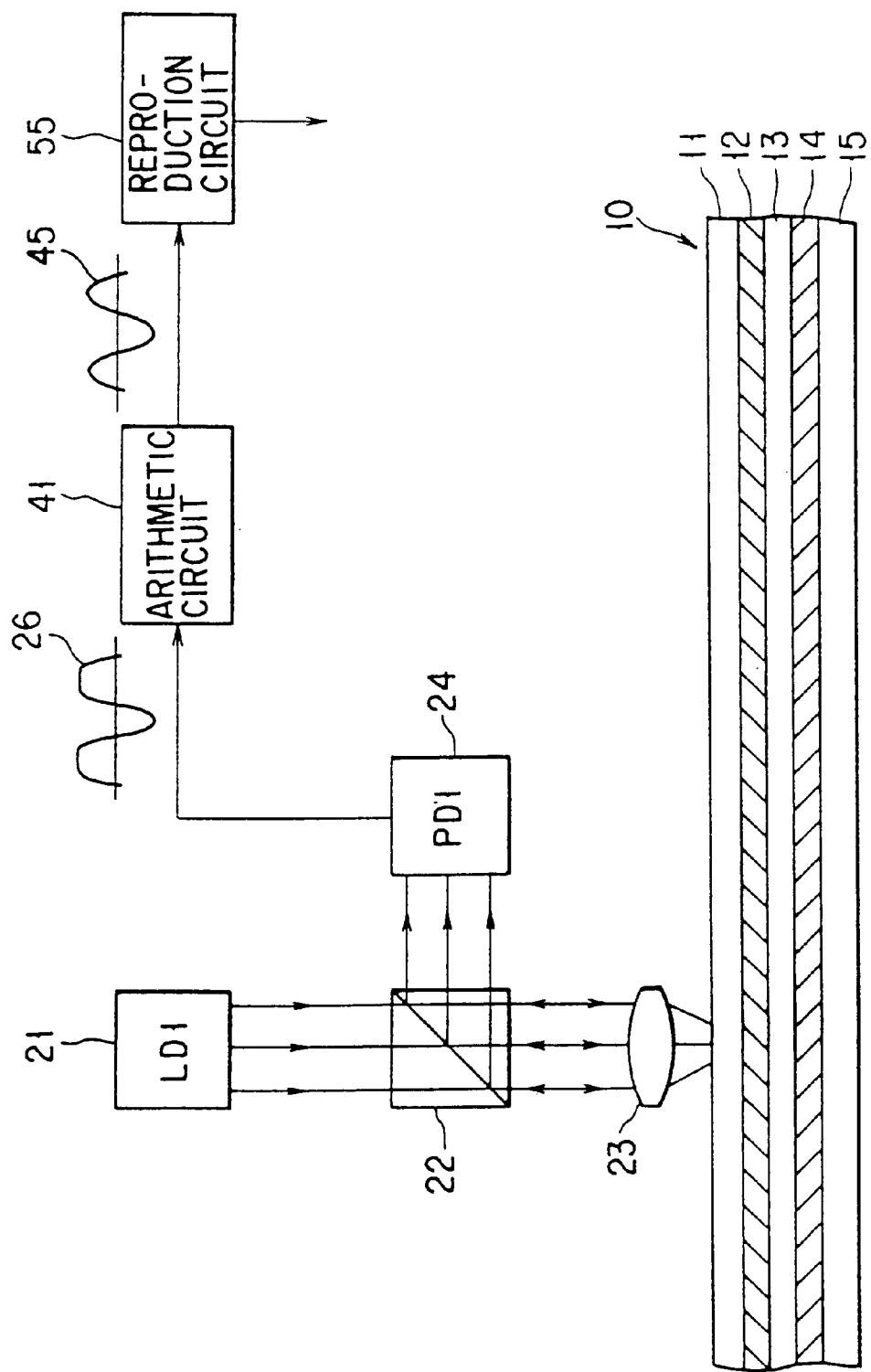
FIG. 26 is a diagram illustrating the construction of recording/reproduction system in the optical disk drive in Example 14.

FIG. 26 shows the construction of the recording/reproduction system of an optical disk drive according to this Example.

According to Examples 12 and 13, a first and a second reproduction system, each provided with an individual light sources 21 and 51 respectively, are employed in principle. A reproduction beam of predetermined intensity is irradiated from the first light source 21 onto the optical disk 10, the resultant reflected beam is detected by the first photodetector 24 so as to generate a first reproduction signal train 26, on the basis of which the intensity of reproduction beam from the second light source 51 is controlled by the arithmetic circuit 56. However, according to this example, the ability of the arithmetic circuit is enhanced, thus making it possible to obtain the similar effect as those of Examples 12 and 13 by making use of a single reproduction system having a single light source.

Namely, in this example, a first reproduction signal train is generated by the first reproduction system in the same construction as that of Example 12 or 13, and the first reproduction signal train is corrected by the arithmetic circuit in accordance with the characteristics of the super-resolution film, thereby to generate a second reproduction signal train. Then, by making use of the second reproduction signal train, information recorded in the optical disk is discriminated and reproduced.

The optical disk 10 shown in FIG. 26 is the same in structure as those of Examples 12 and 13.

In reproduction of information recorded in the optical disk 10, like Examples 12 and 13, a reproduction beam of predetermined intensity emitted from the light source 21 is introduced via the first beam splitter 22 to the first objective lens 23, by means of which the reproduction beam is irradiated onto the optical disk 10 from the substrate 11 side as a fine spot.

A reflected beam from the optical disk 10 passes through the first objective lens 23 in a direction opposite to that of the incident beam and introduced via the beam splitter 22 into the first photodetector 24 so as to be detected as electric signals. The first photodetector 24 is, for example, a split photodetector whose light-receiving surface is divided in a plurality of sections (for example, two or four sections). By adding or subtracting the plurality of output signals corresponding to respective divided surfaces, reproduction signals or error signals for focusing and tracking are generated. The first photodetector 24 involves a function of adder-subtracter.

The reproduction signals (the first reproduction signal train 26) supplied from the photodetector 24 are introduced to the arithmetic circuit 41. The arithmetic circuit 41 generates a second reproduction signal train 45 by correcting the first reproduction signal train 26 in accordance with the characteristics of the super-resolution film 12. The second reproduction signal train 45 is then fed to the reproduction circuit 55 so as to discriminate and reproduce the information recorded in the optical disk 10, thus obtaining reproduction information.

In the arithmetic circuit 41, the transmittances Tr1 and Tr2 of the super-resolution film 12 when a reproduction beam of intensity Io is reflected at the reflectances of Ra and Rc, respectively, followed by being incident on the super-resolution film 12 are treated as the functions proportional to the effective intensities of incident light Ia* and Ic* when the reproduction light spot from the light source is incident on the amorphous portion and on the crystalline portion of the recording layer 14, respectively (Tr1=kIa*, Tr2=kIc*, k is a proportionality factor). These intensities Ia* and Ic* are treated by expanding with respect to Io, for example, by the tertiary terms as follows:

$$Ia^* = Io + kRaIo^2 + k^2Ra^2Io^3$$

$$Ic^* = Io + kRcIo^2 + k^2Rc^2Io^3$$

wherein Io denotes the intensity of a reproduction light from the light source 21; Ra and Rc are reflectances of the amorphous portion and crystalline portion of the recording layer 14. These values can be determined in advance.

The arithmetic circuit 41 corrects the first reproduction signal train 26 in the same manner as in Example 12 by making use of Tr1 (=kIa*) and Tr2 (=kIc*) calculated from Ia* and Ic*. Namely, correction is made by using the following correction coefficients: a coefficient of $1/Io(1+Tr1\times Ra)$ for the bottom of the first reproduction signal train 26 (a portion corresponding to the intensity of reflected light from the amorphous portion); a coefficient of $1/Io(1+Tr2\times Rc)$ for the peak of the reproduction signal train 26 (a portion corresponding to the intensity of reflected light from the crystalline portion); and a coefficient of an arithmetical mean of $1/Io(1+Tr2\times Rc)$ and $1/Io(1+Tr2\times Rc)$ for a point between the bottom and the peak of the reproduction signal train 26, thereby generating the second reproduction signal train 45.

The second reproduction signal train 45 thus obtained comes to form a waveform of single frequency nearly the same as that of the recording signal with low distortion. By feeding the second reproduction signal train 45 to the reproduction circuit 55, it is possible to perform excellent reproduction with low error rate even with respect to recording marks formed with such a narrow pitch as 0.33 μm.

Example 15

Figure 27:
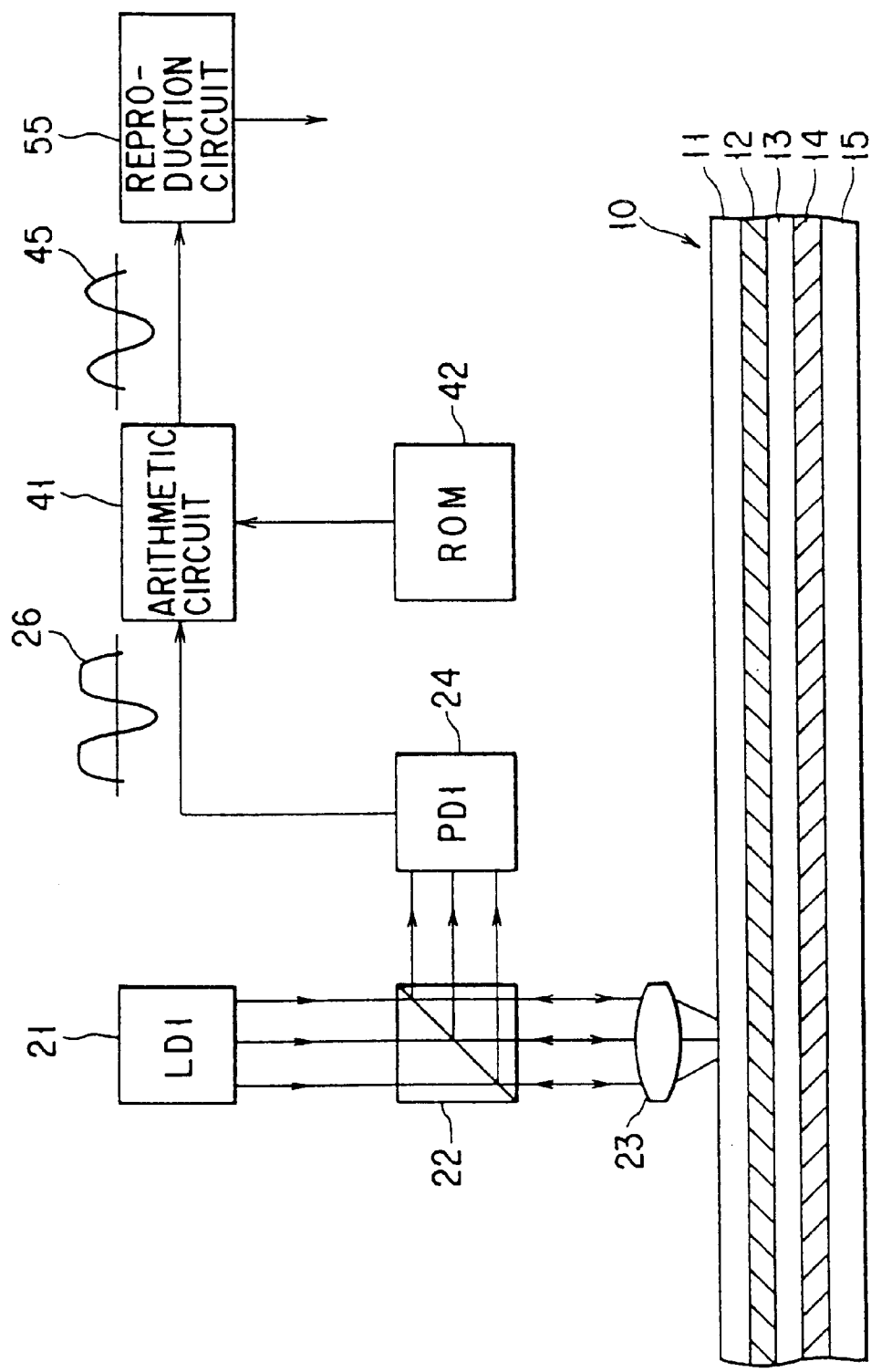
FIG. 27 is a diagram illustrating the construction of recording/reproduction system in the optical disk drive in Example 15.

FIG. 27 shows the construction of the recording/reproduction system of an optical disk drive according to this Example. As shown in this figure, the construction in this Example has a ROM 42 in addition to the construction of Example 14. In the ROM 42, like the ROM 27 in FIG. 25, characteristic data of the super-resolution film 12, specifically, the relationship between the number of incident photons Np and the transmittance Tr as shown in FIG. 10 is stored in the form of table.

In this example, like Example 14, the first reproduction signal train 26 is corrected by the arithmetic circuit 41, whereas, in contrast to Example 14, transmittances Tr1, Tr2 and the data between these transmittances read out from the ROM 42 are employed in this example.

Specifically, since the number of photons enters the super-resolution film 12 varies depending on the recording states of the recording layer as mentioned above, the level of the first reproduction signal train 26 also varies in the same manner. In this example, by generating an address of the ROM 42 with the arithmetic circuit 41 corresponding with the level of the reproduction signal train 26, the transmittance data corresponding to the level of the first reproduction signal train 26 or the number of photons incident on the super-resolution film 12 can be read out.

Namely, in Example 14, the transmittances Tr1 and Tr2 of the super-resolution film 12 are approximated as the functions proportional to effective intensities of incident light Ia* and Ic* incident on the super-resolution film 12. However, in this example, the first reproduction signal train 26 is corrected by making use of the actual relationship between the number of photons Np and the transmittance Tr as shown in FIG. 10, thereby making it possible to reproduce precisely the original signal waveform as a second reproduction signal train 45.

In this example, the shape of the optical aperture in the super-resolution film 12 may be calculated in advance on the basis of the relationship between the number of photons Np and the transmittance Tr shown in FIG. 10 as well as the first reproduction signal train 26, and the calculated data may be stored in the ROM 42 so as to make it possible to correct more strictly the first reproduction signal train 26, thereby to obtain the second reproduction signal train 45.

What is claimed is:

1. An optical disk drive for performing recording and reproduction of an optical disk comprising a recording layer and a super-resolution film disposed on the light incident side with respect to the recording layer, the recording layer having a phase change material that performs reversible phase change between a crystalline phase and an amorphous phase, the super-resolution film having a property to cause change in transmittance by irradiation of light, the optical disk drive comprising:

a light source configured to irradiate the optical disk with a reproduction beam;

a detector configured to detect a reflected beam from the optical disk to generate a first reproduction signal train;

an arithmetic circuit configured to generate a second reproduction signal train by correcting the first reproduction signal train, wherein the arithmetic circuit multiplies a bottom of the first reproduction signal train by a coefficient of $1/Io(1+Tr1\times Ra)$, multiplies a peak of the first reproduction signal train by a coefficient of $1/Io(1+Tr2\times Rc)$ and multiplies a point between the bottom and the peak of the first reproduction signal train by a coefficient of an arithmetical mean of $1/Io(1+Tr1\times Ra)$ and $1/Io(1+Tr2\times Rc)$, respectively, where Io denotes intensity of the reproduction beam from the light source, Ra is a reflectance of an amorphous portion of the recording layer, Rc is a reflectance of a crystalline portion of the recording layer, Rc being higher than Ra, Tr1 is a transmittance of a portion of the super-resolution film corresponding to the amorphous portion of the recording layer and Tr2 is a transmittance of a portion of the super-resolution film corresponding to the crystalline portion of the recording layer; and a reproduction circuit configured to reproduce information recorded in the optical disk from the second reproduction signal train.

2. An optical disk drive for performing recording and reproduction of an optical disk comprising a recording layer and a super-resolution film disposed on the light incident side with respect to the recording layer, the recording layer having a phase change material that performs reversible phase change between a crystalline phase and an amorphous phase, the super-resolution film having a property to cause change in transmittance by irradiation of light, the optical disk drive comprising:

a light source configured to irradiate the optical disk with a reproduction beam;

a detector configured to detect a reflected beam from the optical disk to generate a first reproduction signal train;

an arithmetic circuit configured to generate a second reproduction signal train by correcting the first reproduction signal train, wherein the arithmetic circuit multiplies a peak of the first reproduction signal train by a coefficient of $1/Io(1+Tr1\times Ra)$, multiplies a bottom of the first reproduction signal train by a coefficient of $1/Io(1+Tr2\times Rc)$ and multiplies a point between the peak and the bottom of the first reproduction signal train by a coefficient of an arithmetical mean of $1/Io(1+Tr1\times Ra)$ and $1/Io(1+Tr2\times Rc)$, respectively, where Io denotes intensity of the reproduction beam from the light source, Ra is a reflectance of an amorphous portion of the recording layer, Rc is a reflectance of a crystalline portion of the recording layer, Rc being lower than Ra, Tr1 is a transmittance of a portion of the super-resolution film corresponding to the amorphous portion of the recording layer and Tr2 is a transmittance of a portion of the super-resolution film corresponding to the crystalline portion of the recording layer; and a reproduction circuit arranged to reproduce information recorded in the optical disk from the second reproduction signal train.

3. An optical disk drive for performing recording and reproduction of an optical disk comprising a recording layer and a super-resolution film disposed on the light incident side with respect to the recording layer, the recording layer having a phase change material that performs reversible phase change between a crystalline phase and an amorphous phase, the super-resolution film having a property to cause change in transmittance by irradiation of light, the optical disk drive comprising:

a light sourced configured to irradiate the optical disk with a reproduction beam;

a detector configured to detect a reflected beam from the optical disk to generate a first reproduction signal train;

a memory means arranged to store transmittance characteristic data of the super-resolution film;

an arithmetic circuit configured to generate a second reproduction signal train by correcting the first reproduction signal train, wherein the arithmetic circuit corrects the first reproduction signal train using transmittance characteristic data read from the memory means based on the first reproduction signal train; and a reproduction circuit arranged to reproduce information recorded in the optical disk from the second reproductions signal train.

4. An optical disk drive for performing recording and reproduction of an optical disk comprising a recording layer and a super-resolution film disposed on the light incident side with respect to the recording layer, the recording layer having a phase change material that performs reversible phase change between a crystalline phase and an amorphous phase, the super-resolution film having a property to generate emission resulting from deexcitation of excited electrons in the super-resolution film caused after irradiation of a reproduction beam onto the optical disk, the optical disk drive comprising:

a light source configured to irradiate the optical disk with the reproduction beam;

a first detector configured to detect a reflected beam from the optical disk;

an arithmetic circuit configured to generate a first reproduction signal train based on the reflected beam detected by the first detector;

a second detector configured to detect emission resulting from deexcitation of excited electrons in the super resolution film caused after irradiation of a reproduction beam onto the optical disk to generate emission detection signals; and a compensating circuit configured to compensate the first reproduction signal train based on emission detection signals supplied from the second detector to generate a second reproduction signal train corresponding to information recorded in the optical disk.

5. An optical disk for performing recording and reproduction of an optical disk comprising a recording layer and a super-resolution film disposed on the light incident side with respect to the recording layer, the recording layer comprising a phase change material that performs reversible phase change between a crystalline phase and an amorphous phase, the super-resolution film having a property to generate emission resulting from deexcitation of excited electrons in the super-resolution film caused after irradiation of a reproduction beam onto the optical disk, the optical disk drive comprising:

a light source configured to irradiate the optical disk with the reproduction beam;

a first detector configured to detect a reflected beam from the optical disk;

an arithmetic circuit configured to generate a first reproduction signal train based on the reflected beam detected by the first detector;

a second detector configured to detect emission resulting from deexcitation of excited electrons in the super-resolution film caused after irradiation of a reproduction beam onto the optical disk to generate emission detection signals;

a memory means for storing characteristic data of the super-resolution film; and a compensating circuit configured to compensate the first reproduction signal train based on emission detection signals supplied from the second detector and the characteristic data of the super-resolution film supplied form the memory means to generate a second reproduction signal train corresponding to information recorded in the optical disk.

* * * * *